US012162236B2

(12) United States Patent
Duperray et al.

(10) Patent No.: US 12,162,236 B2
(45) Date of Patent: Dec. 10, 2024

(54) SHAPING TOOL FOR SECONDARY PACKAGES

(71) Applicant: Anheuser-Busch InBev S.A., Brussels (BE)

(72) Inventors: Philippe Jean Marie Duperray, Châteauroux (FR); Wim DeKocker, Leuven (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 321 days.

(21) Appl. No.: 17/631,284

(22) PCT Filed: Jul. 30, 2020

(86) PCT No.: PCT/EP2020/071491
§ 371 (c)(1),
(2) Date: Jan. 28, 2022

(87) PCT Pub. No.: WO2021/019007
PCT Pub. Date: Feb. 4, 2021

(65) Prior Publication Data

US 2022/0250346 A1 Aug. 11, 2022

(30) Foreign Application Priority Data

Jul. 30, 2019 (EP) ..................................... 19189018
Dec. 27, 2019 (EP) ..................................... 19219766

(51) Int. Cl.
*B31B 50/32* (2017.01)
*B31B 50/54* (2017.01)
*B31B 110/35* (2017.01)

(52) U.S. Cl.
CPC .............. *B31B 50/32* (2017.08); *B31B 50/54* (2017.08); *B31B 2110/35* (2017.08)

(58) Field of Classification Search
None
See application file for complete search history.

(56) References Cited

U.S. PATENT DOCUMENTS 2,358,292 A 9/1944 Malhiot
2,932,929 A * 4/1960 Fahrenbach ............ B65B 49/14 53/506

(Continued)

FOREIGN PATENT DOCUMENTS

BE 1027586 B1 4/2021
BR PI0923133 B1 6/2019

(Continued)

OTHER PUBLICATIONS

ABB Robotics, "Picking and packing salami snacks," <https://www.youtube.com/watch?v=aPTd8XDZOEk> YouTube publication date Apr. 19, 2010.

(Continued)

*Primary Examiner* — Tanzim Imam
(74) *Attorney, Agent, or Firm* — ARENTFOX SCHIFF LLP

(57) ABSTRACT

The present invention provides a shaping tool for shaping a package formed of a foldable blank, the tool comprising: —an overhead conveyor comprising a plurality of downwardly protruding spaced apart counter-means; —a first conveyor extending between a receiving end towards an output end, and adapted to receive the foldable blank from an incoming conveying line at the receiving end and to position the foldable blank below one of the downwardly protruding counter-means; —a shaping station extending away from the receiving end, the shaping station comprising: a pair of parallel shaping tracks, each positioned on one side of the first conveyor, the pair of generally parallel shaping tracks comprising a plurality of pairs of independently movable shaping lugs, each pair of shaping lugs (Continued)

having a predetermined shape and adapted to receive one of the foldable blanks there-between; the pair of lugs movable towards each other to form a package having a desired shape.

15 Claims, 18 Drawing Sheets

(56) References Cited

U.S. PATENT DOCUMENTS 3,220,160 A * 11/1965 Roberts ................... B65B 11/10 53/233
3,555,776 A 1/1971 Nigrelli et al.
3,601,246 A 8/1971 Dubois
3,815,320 A * 6/1974 Ganz ....................... B65B 21/24 53/48.9
3,841,476 A 10/1974 Elford
RE28,535 E * 9/1975 Ganz ....................... B65B 53/02 53/448
4,191,003 A 3/1980 Talarico
4,641,742 A 2/1987 Igarashi et al.
5,011,126 A 4/1991 Suzuki et al.
5,237,468 A 8/1993 Ellis
5,261,520 A 11/1993 Duke
5,388,389 A 2/1995 Tisma
5,558,200 A 9/1996 Whitby et al.
5,607,045 A 3/1997 Hermann Kronseder
5,966,899 A 10/1999 Fontanazzi
6,191,507 B1 2/2001 Peltier et al.
6,201,203 B1 3/2001 Tilles
6,209,710 B1 4/2001 Mueller et al.
6,421,984 B1 7/2002 Murgatroyd et al.
6,467,608 B2 10/2002 Stauber
6,733,224 B1 5/2004 Linner
6,811,019 B2 11/2004 Christian et al.
6,848,566 B2 2/2005 Harnish et al.
6,868,652 B2 3/2005 Arends et al.
6,876,107 B2 4/2005 Jacobs
6,904,733 B2 6/2005 Boix Jaen
7,093,408 B2 8/2006 Duperray et al.
7,134,258 B2 11/2006 Kalany et al.
7,146,784 B1 12/2006 Portrait
7,153,085 B2 12/2006 Clark et al.
7,309,203 B2 12/2007 Clark et al.
7,310,925 B2 12/2007 Monti
7,320,203 B2 1/2008 Monti
7,392,630 B2 7/2008 Ford
7,401,451 B2 7/2008 Bennett
7,401,453 B2 7/2008 Ford
7,461,838 B2 12/2008 Hendricks et al.
7,543,424 B2 6/2009 Lechner et al.
7,543,425 B2 6/2009 Monti
7,549,276 B2 6/2009 Monti
7,552,570 B2 6/2009 Raudat et al.
7,631,474 B2 12/2009 Ford
7,735,296 B2 6/2010 Momich
7,779,606 B2 8/2010 Ford
7,789,219 B2 9/2010 Baldanza et al.
7,803,099 B2 9/2010 Biraud et al.
7,806,250 B2 10/2010 Ford
8,033,082 B2 10/2011 Raudat et al.
8,096,409 B2 1/2012 Wipf et al.
8,322,514 B2 12/2012 Bonnain et al.
8,430,232 B2 4/2013 Baldanza et al.
8,448,777 B2 5/2013 Pazdernik
8,534,727 B2 9/2013 Weclawski et al.
8,671,651 B2 3/2014 Poutot
8,776,985 B2 7/2014 Huettner et al.
8,777,552 B2 7/2014 Ward et al.
8,876,182 B2 11/2014 Eidelberg et al.
8,903,540 B2 12/2014 Stork et al.
9,045,291 B2 6/2015 Konrad et al.
9,061,838 B2 6/2015 Van De et al.
9,199,757 B2 12/2015 Kolb
9,233,800 B2 1/2016 Senn et al.
9,309,016 B2 4/2016 Stork et al.
9,365,366 B2 6/2016 Girtman
9,403,611 B2 8/2016 Sacchetti et al.
9,533,785 B2 1/2017 Rapp et al.
9,540,127 B2 1/2017 Papsdorf et al.
9,546,049 B2 1/2017 Lindauer
9,573,771 B2 2/2017 Papsdorf et al.
9,580,253 B2 2/2017 Papsdorf et al.
9,604,792 B2 3/2017 Wipf
9,611,102 B2 4/2017 Job et al.
9,725,197 B2 8/2017 Pettersson et al.
9,731,854 B2 8/2017 Mann et al.
9,796,495 B2 10/2017 Boden et al.
9,802,507 B2 10/2017 Clark
9,809,392 B2 11/2017 Walter et al.
9,856,092 B2 1/2018 Job et al.
9,873,571 B2 1/2018 Hahn
9,938,031 B2 4/2018 Shurtleff et al.
9,950,875 B2 4/2018 Walter et al.
9,957,072 B2 5/2018 Shurtleff et al.
9,963,258 B2 5/2018 Rapp et al.
9,988,166 B2 6/2018 Avril et al.
10,029,855 B2 7/2018 Grosskreuz et al.
10,106,331 B2 10/2018 Radak et al.
10,139,351 B2 11/2018 Piana et al.
10,150,219 B2 12/2018 Ridel et al.
10,161,970 B2 12/2018 Sun et al.
10,246,266 B2 4/2019 Weber et al.
10,287,105 B2 5/2019 Hayashi et al.
10,407,195 B2 9/2019 Sassi et al.
10,486,914 B2 11/2019 Choplin
10,604,291 B2 3/2020 Hutter et al.
10,669,049 B2 6/2020 Eberhardt et al.
10,696,488 B2 6/2020 Papsdorf et al.
10,717,606 B2 7/2020 Papsdorf et al.
10,766,650 B2 9/2020 Choplin et al.
10,773,847 B2 9/2020 Bellante
10,829,255 B2 11/2020 Aumann et al.
10,850,881 B2 12/2020 Langen et al.
10,882,704 B2 1/2021 Torrero
10,919,705 B2 2/2021 Papsdorf et al.
11,001,400 B2 5/2021 Kalany et al.
2001/0019006 A1 9/2001 Stauber
2002/0083680 A1* 7/2002 Duperray ................ B65B 21/06 53/48.8
2003/0015402 A1 1/2003 Bennett
2003/0230941 A1 12/2003 Jacobs
2004/0262127 A1 12/2004 Harnish et al.
2005/0220582 A1 10/2005 Kumagai et al.
2006/0207220 A1 9/2006 Ford
2007/0072756 A1 3/2007 Monti
2007/0119123 A1 5/2007 Clark et al.
2007/0152458 A1 7/2007 Guidetti
2008/0000756 A1 1/2008 Behnke et al.
2008/0196362 A1 8/2008 Monti
2008/0283361 A1 11/2008 Martini et al.
2009/0229227 A1 9/2009 Raudat et al.
2010/0084247 A1 4/2010 Wipf et al.
2010/0140052 A1 6/2010 Martini
2010/0192515 A1 8/2010 Chalendar et al.
2011/0150610 A1 6/2011 Weber
2011/0154784 A1 6/2011 Poutot
2011/0173930 A1 7/2011 Poutot
2012/0085623 A1 4/2012 Wipf
2012/0261233 A1 10/2012 Huettner et al.
2013/0042580 A1* 2/2013 May ........................ B65B 21/24 53/457
2014/0194267 A1 7/2014 Pradelli
2014/0262685 A1 9/2014 Job et al.
2014/0299445 A1 10/2014 Kolb
2014/0377049 A1 12/2014 Girtman
2015/0001041 A1 1/2015 Barber et al.
2015/0063963 A1 3/2015 Kinugawa
2015/0139772 A1 5/2015 Rapp et al.
2015/0158611 A1* 6/2015 Kalany .................. B65G 47/26 53/531
2015/0321857 A1 11/2015 Sacchetti et al.
2016/0068290 A1 3/2016 Bonnain et al.

(56) References Cited

U.S. PATENT DOCUMENTS

| | | | |
|---|---|---|---|
| 2016/0107782 | A1 | 4/2016 | Hutter et al. |
| 2016/0214749 | A1 | 7/2016 | Cannell-Smith |
| 2017/0349308 | A1 | 12/2017 | May et al. |
| 2018/0186579 | A1 | 7/2018 | Choplin |
| 2018/0222608 | A1 | 8/2018 | Hutter et al. |
| 2019/0233151 | A1 | 8/2019 | Ford et al. |
| 2019/0255698 | A1 | 8/2019 | Zeiner et al. |
| 2020/0189779 | A1 | 6/2020 | Canalicchio et al. |
| 2020/0290815 | A1 | 9/2020 | Papsdorf et al. |
| 2020/0290816 | A1 | 9/2020 | Papsdorf et al. |
| 2021/0139176 | A1 | 5/2021 | Bonnain |

FOREIGN PATENT DOCUMENTS

| | | | |
|---|---|---|---|
| CN | 1164500 | A | 11/1997 |
| CN | 1203879 | A | 1/1999 |
| CN | 202729327 | U | 2/2013 |
| CN | 103619714 | A | 3/2014 |
| CN | 108674883 | A | 10/2018 |
| CN | 208216241 | U | 12/2018 |
| CN | 108454224 | B | 6/2020 |
| DE | 1236531 | B | 3/1967 |
| DE | 3709046 | C1 | 10/1988 |
| DE | 4208818 | A1 | 9/1993 |
| DE | 19602358 | C1 | 3/1997 |
| DE | 19628563 | A1 | 1/1998 |
| DE | 10121038 | A1 | 10/2002 |
| DE | 10346415 | A1 | 5/2005 |
| DE | 202005006755 | U1 | 10/2005 |
| DE | 102004026455 | A1 | 12/2005 |
| DE | 102005014863 | A1 | 10/2006 |
| DE | 202010001712 | U1 | 6/2011 |
| DE | 102011076864 | A1 | 12/2012 |
| DE | 102011015741 | B4 | 1/2013 |
| DE | 102011081705 | A1 | 2/2013 |
| DE | 102011085724 | A1 | 5/2013 |
| DE | 102014105998 | A1 | 2/2015 |
| DE | 102014103632 | A1 | 9/2015 |
| DE | 102015203412 | A1 | 9/2015 |
| DE | 102015114654 | A1 | 3/2017 |
| DE | 102016212227 | A1 | 1/2018 |
| DE | 102016212237 | A1 | 1/2018 |
| DE | 102016121361 | A1 | 5/2018 |
| DE | 202018103487 | U1 | 8/2018 |
| DE | 102016105570 | B4 | 1/2019 |
| DE | 102019107313 | A1 | 9/2020 |
| DE | 102020107427 | A1 | 9/2020 |
| DE | 102019204393 | A1 | 10/2020 |
| EP | 0439741 | A1 | 8/1991 |
| EP | 0496046 | B1 | 1/1995 |
| EP | 0795474 | A1 | 9/1997 |
| EP | 0806350 | A1 | 11/1997 |
| EP | 0813494 | B1 | 9/1999 |
| EP | 1231145 | A1 | 8/2002 |
| EP | 1123886 | B1 | 8/2004 |
| EP | 1522402 | B1 | 6/2006 |
| EP | 1327591 | B1 | 11/2006 |
| EP | 1790593 | A1 | 5/2007 |
| EP | 1067048 | B1 | 8/2008 |
| EP | 2014559 | A1 | 1/2009 |
| EP | 1645340 | B1 | 10/2010 |
| EP | 2192063 | B1 | 4/2012 |
| EP | 2757043 | A1 | 7/2014 |
| EP | 2673224 | B1 | 1/2015 |
| EP | 2560904 | B1 | 4/2015 |
| EP | 2484611 | B1 | 9/2015 |
| EP | 2500296 | B1 | 2/2016 |
| EP | 2634100 | B1 | 2/2016 |
| EP | 2921433 | B1 | 9/2016 |
| EP | 3034415 | B1 | 3/2017 |
| EP | 3034441 | B1 | 4/2017 |
| EP | 3024737 | B1 | 7/2017 |
| EP | 2980010 | B1 | 8/2017 |
| EP | 2861496 | B1 | 9/2017 |
| EP | 3022138 | B1 | 10/2017 |
| EP | 3038959 | B1 | 11/2017 |
| EP | 2848382 | B1 | 12/2017 |
| EP | 2736834 | B1 | 2/2018 |
| EP | 3003927 | B1 | 3/2018 |
| EP | 3266718 | B1 | 7/2018 |
| EP | 3109998 | B1 | 8/2019 |
| EP | 3363751 | B1 | 4/2020 |
| EP | 3659932 | A2 | 6/2020 |
| EP | 3251986 | B1 | 1/2021 |
| EP | 3230181 | B2 | 7/2021 |
| EP | 3422562 | B1 | 10/2021 |
| FR | 3088842 | A1 | 5/2020 |
| GB | 1340427 | A | 12/1973 |
| GB | 2434356 | A | 7/2007 |
| IT | BO990370 | A1 | 1/2001 |
| IT | BO990484 | A1 | 3/2001 |
| JP | S54128282 | U | 9/1979 |
| JP | S6277149 | U | 5/1987 |
| JP | H05254644 | A | 10/1993 |
| JP | 2011025392 | A | 2/2011 |
| JP | 2018184294 | A | 11/2018 |
| WO | WO99036317 | A2 | 7/1999 |
| WO | WO00068087 | A2 | 11/2000 |
| WO | WO01085581 | A1 | 11/2001 |
| WO | WO2004024401 | A1 | 3/2004 |
| WO | WO2005070768 | A1 | 8/2005 |
| WO | WO2006098556 | A1 | 9/2006 |
| WO | WO2007033267 | A2 | 3/2007 |
| WO | WO2008036754 | A2 | 3/2008 |
| WO | WO2010120869 | A1 | 10/2010 |
| WO | WO2011127367 | A1 | 10/2011 |
| WO | WO2011138448 | A1 | 11/2011 |
| WO | WO2012057996 | A2 | 5/2012 |
| WO | WO2013005120 | A1 | 1/2013 |
| WO | WO2013185954 | A1 | 12/2013 |
| WO | WO2014072518 | A2 | 5/2014 |
| WO | WO2014118631 | A1 | 8/2014 |
| WO | WO2014187543 | A1 | 11/2014 |
| WO | WO2015101862 | A1 | 7/2015 |
| WO | WO2016012158 | A1 | 1/2016 |
| WO | WO2016012159 | A1 | 1/2016 |
| WO | WO2016069190 | A1 | 5/2016 |
| WO | WO2016069457 | A1 | 5/2016 |
| WO | WO2016146213 | A1 | 9/2016 |
| WO | WO2016188843 | A1 | 12/2016 |
| WO | WO2016200753 | A1 | 12/2016 |
| WO | 2017/174347 | A1 | 10/2017 |
| WO | WO2017167421 | A1 | 10/2017 |
| WO | WO2018049125 | A1 | 3/2018 |
| WO | WO2018144552 | A1 | 8/2018 |
| WO | WO2018145214 | A1 | 8/2018 |
| WO | WO2018161160 | A1 | 9/2018 |
| WO | WO2018193218 | A1 | 10/2018 |
| WO | WO2019007923 | A1 | 1/2019 |
| WO | WO2019129968 | A1 | 7/2019 |
| WO | WO2020126218 | A1 | 6/2020 |
| WO | WO2020146486 | A1 | 7/2020 |
| WO | WO2020244951 | A1 | 12/2020 |

OTHER PUBLICATIONS

All Packaging Company, "Folding Carton continuous printing at up to 20k sheets per hour," <https://www.youtube.com/watch?v=Bc8ZnHukvN0> YouTube publication date Mar. 3, 2013.

Bastian Solutions, "High-Speed Pick & Place Robots by Basitan Solutions," <https://www.youtube.com/watch?v=6RKXVefE98w> YouTube publication date Apr. 3, 2012.

BluePrint Automation, "20237 BluePrint Automation (BPA) Robotic Pick & Place Case Packer (Model: Robotic Top Loader," <https://www.youtube.com/watch?v=RjxTeuyaH_Q> YouTube publication date Apr. 13, 2012.

BOBST, "BOBST Ambition folder-gluers," <https://www.youtube.com/watch?v=EvLkFkz-Uv0> YouTube publication date Jan. 29, 2015.

Packagingspace, "Cama Group complete packaging lineup.mpg," <https://www.youtube.com/watch?v=6uTnz59b4H8> YouTube publication date May 16, 2011.

(56) References Cited

OTHER PUBLICATIONS

Packfeeder, "Robotic bottle unscrambler—Pickfeeder Twin 200," <https://www.youtube.com/watch?v=ueiOqVip7-c> YouTube publication date Dec. 11, 2018.

Professional Packaging Systems, "A-B-C 450 High Speed Case Erector and Bottom Sealer / ProPac.com," <https://www.youtube.com/watch?v=w6w9psSstKA> YouTube publication date Sep. 3, 2010.

STAX Technologies, "Case packer + palletizer," <https://www.youtube.com/watch?v=YtNft4FYkDw> YouTube publication date May 6, 2015.

International Search Report and Written Opinion for Application No. PCT/EP2020/071491 dated Aug. 26, 2020 (10 pages).

International Preliminary Report on Patentability for Application No. PCT/EP2020/071491 dated Feb. 10, 2022 (8 pages).

First Office Action received for Chinese Patent Application No. 202080067852.6, mailed on Dec. 13, 2023, 16 pages (5 pages of English Translation and 11 pages of Original Document).

* cited by examiner

SHAPING TOOL FOR SECONDARY PACKAGES

CROSS REFERENCE TO RELATED APPLICATIONS

This application is a national stage filing under 35 U.S.C. § 371 of International Patent Application No.: PCT/EP2020/071491, filed Jul. 30, 2020, which claims priority to European Patent Application No. 19189018.5, filed Jul. 30, 2019, and European Patent Application No. 19219766.3, filed Dec. 27, 2019, the entire contents of which all are hereby incorporated by reference herein.

TECHNICAL FIELD

The present invention relates generally to the formation of packages; and more particularly relates to a shaping tool for forming packages having a predetermined shape.

BACKGROUND

In the recent years, there has been a many-fold increase in the packaging trend for primary as well as secondary packaging, e.g. for the purpose of grouping a number of items such as food items, including liquid foods, home essentials, stationary items, beverage containers, and the like, for various purposes such as to enable bulk selling, easy transportation, handling, and the like.

There has been a considerable increase in the use of folding box-based packages for holding a plurality of items or objects, and therefore the number of boxes that are manufactured is increasing. Further, due to marketing, and for utility purposes, these boxes are prepared in a variety of shapes and sizes.

These packages are generally formed from foldable blanks, commonly die cut from large sheets or rolls. The sheets or rolls may be printed, embossed, coated, and die cut in a continuous process at the packaging material supplier, of which die cutting is the final step. Thereafter, these foldable blanks are folded at the product producer using one or more folding mechanisms to obtain the package of the desired shape.

Numerous folding mechanisms have been proposed for shaping these precut blanks. In some instances, these foldable blanks are scored, and provided with fold-lines & cut-outs to form wall corner portions and joining portions at the ends of corresponding first wall forming portions. In operation, the wall forming portions are erected and the corner portions are bent to connect the joining portion to form a folding box package. One such technique is disclosed within U.S. Pat. No. 3,841,476, disclosing the use of a pre-cut blank of cardboard or like material to form a tray shaped package. The blank is scored and provided with cut-outs to form wall corner portions and uniting portions at the ends of corresponding first wall forming portions and also to form strengthening tabs. The tray is formed by first erecting the strengthening tabs and by then erecting the first and second wall forming portions and finally bending the corner portions and uniting portions so that the latter can be secured to the second wall forming portions. However, the use of scoring/folding line techniques shows the typical limitation of the folding machinery being package specific and being suitable only for the typically rectangular shape of package in a limited range of sizes and material thicknesses. Further, the method is suitable generally for packages requiring straight folds and not for packages with innovative designs including miters, curves, inclines, off-sets, curves and rounded sides, panels and/or corners.

Other folding tools, e.g. pivotally mounted on conveyors, have been provided in the art. These tools include molds within which a moving foldable blank is received and pushed by a means of an ascending/descending core to form a package similar to the shape of mold.

In some other instances, a package of a predetermined shape is obtained by placing the foldable blank between plurality of molds and thereafter the sheet is pushed against the mold such that a box of shape corresponding to the mold is formed. One such mold based shaping mechanism is disclosed within WO2017174347A1 which discloses a device for molding a closed packaging comprising the following: a base for supporting the bottom of the packaging and at least two support elements for supporting the lateral surfaces and at least two sliding elements for molding the lateral surfaces of the packaging. The support elements and the sliding elements have at least one molding surface on the element face paired with the packaging. The aim of the invention is to allow a precise molding of the packaging even for closed packaging with a complex geometry.

However, such mold based shaping of packages is not preferred in case of e.g. industrial applications requiring a large range of sizes and shapes, necessitating the use of several molds in accordance with the packaging range; this mold-based method therefore poses quite some challenges in terms of efficiency, cost and capability to shape various complex packages.

Accordingly, as can be understood from the foregoing discussion, none of the existing solutions completely overcomes the problem of using a single shaping tool for shaping packages of varying sizes and design. Thus, in the context of the above, an improved shaping tool is desired, which being cost effective and easy to implement allows to carry out the shaping of packages of a wide range of size, shape, material and functional design features, without requiring pack specific interchanging elements, sub-assemblies, nor components.

SUMMARY

In an aspect of the invention, a shaping tool for forming a package is provided. Said package may have one or more contact portions of a predetermined shape, and formed of a foldable blank having a bottom panel extended towards a first side panel in one direction and a second side panel in a direction opposite to the first direction, is provided. The shaping tool includes an overhead conveyor having a plurality of downwardly protruding spaced apart counter-means configured thereon. Preferably these counter-means are individually pitch and pace controllable. The shaping tool further includes a first conveyor extending between a receiving end towards an output end and adapted to receive foldable blanks from an incoming conveying line and to position the foldable blank and/or the package below one of the downwardly protruding counter-means. The first conveyor may include a plurality of clamping means, each configured to be positioned below one of the downwardly protruding counter-means and adapted to clamp a foldable blank there between. The first conveyor may further include an erecting means for erecting each of the already clamped foldable blanks, while moving on the said first conveyor from the receiving end towards the output end.

The shaping tool furthermore includes a shaping station extending away from the erecting means towards the output end and having a pair of parallel shaping tracks, each track positioned on a different side and generally parallel to the first conveyor. Each of the shaping tracks includes a plurality of independently movable lugs configured in pairs, wherein a first lug within a pair of lugs is attached to a first parallel shaping tracks and a second lug within said pair of lugs is attached to the second parallel shaping track, and adapted to support the carton/package there-between the shaping tracks. Each of the pair of lugs has a predetermined shape in accordance to a desired shape of the package. In operation, each of the foldable blank received at the receiving end of the first conveyor is first clamped by the clamping means, erected by the erecting means and then shaped into a carton of the desired shape at the shaping station, while being conveyed towards the output end.

Potentially, the clamping means includes one or more clamping plates adapted to clamp the bottom wall panel of the foldable blank below one of the counter-means.

Further potentially, the erecting means includes either a pair of parallel sloping rails, each configured onto one side of the first conveyor such that the side panels of each of the clamped foldable blank gets erected around the corresponding counter means, while being conveyed towards the output end, or an actuated folding mechanism (not shown) configured to fold the side panels, 291 and 292, of the foldable blank within a short distance of first conveyor movement, without imposing any torque or moment on the location and alignment of the foldable blank 290 and causing the side panels of the blank to fold at the score line by application of evenly distributed forces across the lengths of the side panels being folded.

Possibly, the pair of shaping tracks in the shaping station include a transversal moving mechanism for enabling a transversal and/or pivotal movement of one or more pair of shaping lugs.

Further possibly, the said transversal moving mechanism includes an extension means configured onto each of the pair of movable lugs for moving the lugs transversally towards and away from each other.

Generally, the shaping tool includes a receiving conveyor configured at the output end, at a height lower than the first conveyor, and adapted to receive the supply of the carton of desired shape.

Potentially, the shaping tool further includes a generally slanted conveyor configured at a height above the first conveyor but lower than the overhead track, and extending towards the receiving conveyor.

Further potentially, the slanted conveyor includes a plurality of picking means, each adapted to pick up one of the shaped package from the first conveyor and deliver towards the receiving conveyor.

Alternatively, the slanted conveyor may be a generally horizontally tilted conveyor belt adapted to pull away each of the shaped secondary package frictionally away from the corresponding counter-means.

Additionally, the incoming conveying line includes one or more incoming oval tracks adapted to deliver the supply of foldable blanks to the receiving end of the first conveyor.

Preferably, the one or more incoming tracks, the first conveyor, each of the parallel the shaping tracks, the overhead conveyor and the slanted conveyor are adapted to continuously move at a predetermined pitch so as to convert the supply of foldable blanks into cartons of the desired shaped continuously.

Further preferably, the slanted conveyor is adapted to move at a pitch relative to and hence synchronized with, the overhead conveyor such that counter means of the overhead is freed from the shaped secondary package while it is received onto the receiving conveyor.

Alternatively, the one or more incoming tracks, the first conveyor, each of the parallel shaping tracks, the overhead conveyor and the slanted conveyor are adapted to move continuously or intermittently (in an indexing fashion) at a variable pitch as required, so as to convert the supply of foldable blanks into cartons/packages of the desired shaped either continuously of intermittently.

Potentially, the shaping tool includes a first powering means for enabling a movement of the one or more incoming tracks, the first conveyor, each of the parallel shaping tracks, the overhead conveyor and the slanted conveyor.

Possibly, the first powering means is a linear servo motor or any other type of means for individual motion controlled driving Alternatively, the powering means may be selected from one or more of but not limited to various conventionally known controllable, actuators, servo drives, independent cart or mover technologies and the like, conventionally known in the art.

Additionally, the shaping tool includes a plurality of movers movingly configured onto each of the first conveyor, the parallel shaping tracks, the overhead conveyor, and the slanted conveyor, each of the movers adapted to movingly engage the corresponding clamping means, the movable lugs, the counter-means and the picking means respectively.

Further, each of the plurality of movers is individually powered by a second powering means, preferably a linear motor or or any other type of means for individual motion controlled driving of the mover. In the case of linear drives, utilizing each of the movers as a rotor thereof and the corresponding track as a stator thereof.

In an embodiment of the present invention, each of the movers adapted to movingly engage the corresponding clamping means, the movable lugs, the counter-means and the picking means respectively may be wirelessly powered, for example via sliding contacts on the movers, or preferably contactless powered, for example by providing inductive power to the movers. Further, each mover may be wirelessly controlled, including but not limited to short range wireless, such as Bluetooth, Infrared, Microwave or WLAN narrow through broadband telecommunication protocols and the like, preferably in combination with wirelessly powering. Wireless automation and control and wireless power supplies used to realize synchronized, highly flexible, large range, shaping operations, even while the foldable blanks or packages are in transit.

The counter means may be a plunger means having a shape enabling the formation of the predetermined desired shape of the carton and adapted to support the package formation from inside the package while shaping the contact portions of the erected carton.

The foldable blank may be of a material selected from one or more of but not limited to a carton paperboard, corrugated paperboard, laminated board, thermoplastic, hybrid material, and the like.

Furthermore, the foldable blank may include one or more side flaps configured onto at least one of the side panels, and further including one or more engaging mechanisms for closing the side flaps.

Yet further possibly, the said engaging mechanism may be selected from one or more of but not limited to a glue layer, locking cut-outs, and the like.

Particularly, the contact portion is selected from one or more of but not limited to a side and/or corner and/or edges of the package.

Possibly, the shaping tool further includes a control unit for optimizing the movement of the one or more incoming tracks, the first conveyor, each of the parallel shaping tracks, the overhead conveyor and the slanted conveyor.

Further possibly, the control unit is adapted to optimize the synchronized movement of the plurality of movers so as to longitudinally move the corresponding clamping means and/or the corresponding counter means and/or the corresponding shaping lugs and/or the corresponding picking means independently and relative to each other in a variable and yet synchronized fashion.

Yet further possibly, the control unit includes one or more sensors, one or more input unit, a processor unit and an output unit.

In an embodiment of the present invention, each of the one or more incoming tracks, the first conveyor, and/or each of the parallel shaping tracks, and/or the overhead conveyor and/or the slanted conveyor may be horizontally and/or vertically position settable.

In yet another aspect of the invention, a method of forming a package of a predetermined shape from a foldable blank using the shaping tool of current disclosure, is provided. The method includes receiving one or more foldable blanks at the receiving end of the first conveyor, each of the foldable blanks having a bottom panel extended towards a first side panel in first direction and a second side panel in a second direction opposite to the first direction.

The method further includes clamping the received foldable blank between one of the clamping means and a corresponding counter means. The method furthermore includes erecting the first side panel and the second side panel around the counter means while moving the clamped foldable blank towards the output end onto the first conveyor. The method furthermore includes receiving the clamped erected foldable blank at the shaping station between one or more pair of lugs, and optimizing the movement of the pairs of lugs longitudinally and transversally to apply a predetermined pushing sequence onto one or more contact portions of the erected foldable blank, thereby closing the side panels and forming a package having a predetermined shape.

Additionally, the method includes picking the already shaped secondary package from the first conveyor using one of the picking means and delivering to the receiving conveyor.

Particularly, each of the one or more pair of shaping lugs are moved together in a predetermined sequence of transversal movement and/or longitudinal movement and/or pivotal movement, so as to push and in turn shape the one or more contact portions of the erected blank.

Furthermore, the method includes optimizing the pushing, pulling, holding sequence of the side flaps to align and engage them together and thereby closing the side flaps of the carton and in a consistently manner repeatedly achieve the desired dimensions, shape and flap alignment of the pack.

Possibly, the automated pushing or pulling or holding sequence is determined by the control unit on the basis of an automation recipe, an input from a user and/or inputs from one or more sensors.

The details of one or more implementations are set forth in the accompanying drawings and the description below. Other aspects, features and advantages of the subject matter disclosed herein will be apparent from the description, the drawings, and the claims.

DETAILED DESCRIPTION

It is to be understood that the enclosed embodiments are merely exemplary of the present invention, which may be embodied in various and/or alternative forms. Specific structural and functional details disclosed herein are not to be interpreted as limiting, but merely as a basis for the claims and as a representative basis for teaching one skilled in the art to variously employ the present invention in virtually any appropriately detailed structure.

Aspects, advantages and/or other features of the exemplary embodiments of the present disclosure will become apparent in view of the following detailed description. In describing exemplary embodiments, specific terminology is employed for the sake of clarity. However, the embodiments are not intended to be limited to this specific terminology. It is to be understood that each specific portion includes all technical equivalents that operate in a similar manner to accomplish a similar purpose.

Exemplary embodiments may be adapted for many different purposes and are not intended to be limited to the specific exemplary purposes set forth herein. Those skilled in the art would be able to adapt the exemplary-only embodiments of the present invention, depending for example, on the intended use.

The present application discloses a shaping tool, for forming a package of a desired shape. It is to be understood that the said package may be a primary or a secondary package, the said secondary package adapted to hold e.g. a plurality of items or objects such as e.g. food items, including containers of liquid foods or beverages, home essentials, stationary items, and the like. An efficiency of the shaping tool is the ability to form packages of a predetermined shape in various sizes without requiring major changes in the functional elements thereof. Further, the predetermined shapes may be varied by changing only one shaping component of the tool, without requiring significant change of the entire apparatus. While the package of the current disclosure is exemplified as a generally box shaped container formed of a foldable blank, it should be understood that the embodiments of the present invention may be applied in combination with various type of design and utilities irrespective of size, shape and materials.

Figure 1:
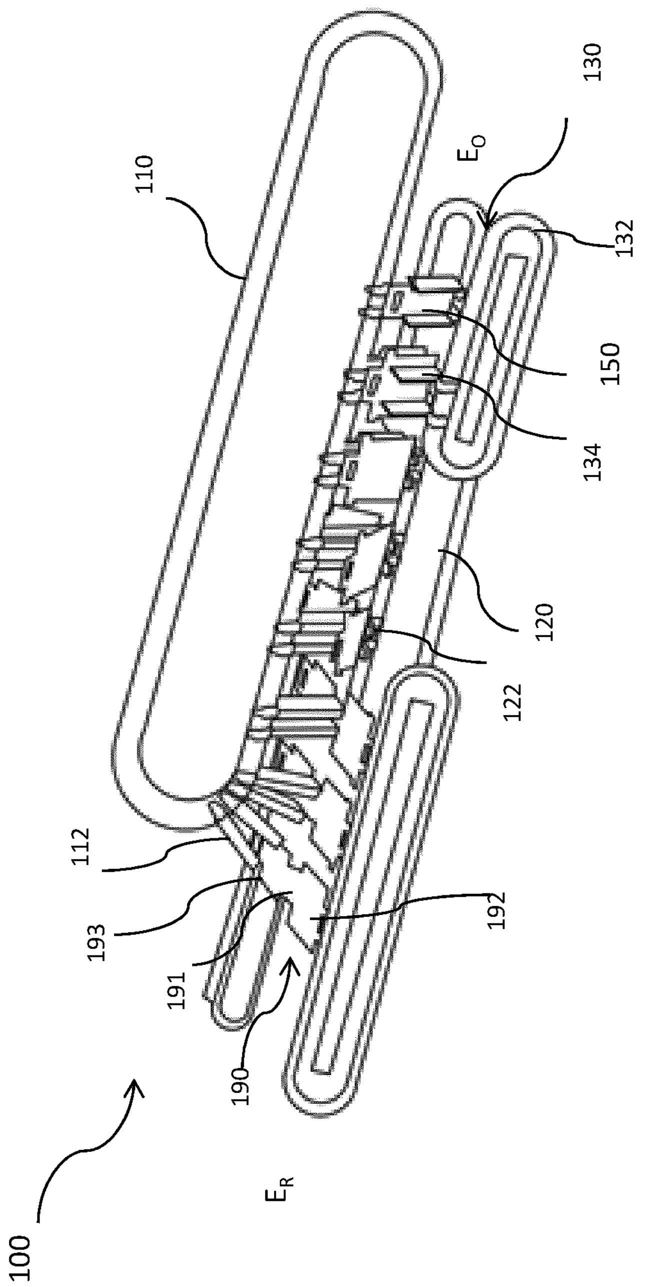
FIG. 1 illustrates a schematic diagram representing a shaping tool, in accordance with a preferred embodiment of the present invention.

As illustrated in FIG. 1, the present invention provides a shaping tool 100 for forming a package 150 of a predetermined shape, from a foldable blank 190 having a bottom panel 191 extended towards a first side panel 192 in one direction and a second side panel 193 in a second direction. Said foldable blanks 190 are continuously supplied from an incoming line 105 and shaped by employing a shaping tool 100 for shaping one or more contact portions of the secondary package 150. The shaping tool 100 includes an overhead oval conveyor 110 having a plurality of preferably individually pitch, pace, and motion controllable, generally downwardly protruding (perpendicular to the track) spaced apart counter-means 112 configured thereon, when considering the lower portion of the oval track. The shaping tool 100 further includes a first conveyor 120 positioned below the overhead conveyor 110, extending between a receiving end $E_R$ towards an output end $E_O$ and adapted to receive a supply of foldable blanks 190 from an incoming conveying line 105. The incoming conveying line 105 is generally a conveying apparatus and in preferred embodiment includes two generally parallel oval tracks 105*a*, 105*b*. The first conveyor 120 includes a plurality of, preferably individually pitch and pace, motion controllable, clamping means 122, each configured to be positioned below one of the downwardly protruding counter-means 112 and adapted to clamp one of the foldable blank 190 there between. The first conveyor 120 further includes an, preferably individually pitch and pace, motion controllable erecting means (not shown) for erecting each of the foldable blanks 190 received onto the clamping means 122 while moving onto the first conveyor 120 from the receiving end $E_R$ towards the output end $E_O$.

The shaping tool 100 further includes an individually pitch and pace, motion controllable shaping station 130 having a pair of parallel shaping tracks 132, each positioned on a different side parallel to the first conveyor 120 and extending away from the erecting means (not shown) towards the output end $E_O$. The parallel shaping tracks 132 include a plurality of pair of independently pitch and pace, motion controllable shaping lugs 134, adapted to support the erected foldable blank 190 there-between the shaping tracks 132. Each of the pair of lugs 134 is formed into a predetermined shape enabling the formation of the predetermined desired shape of the package 150. The shaping station 130 further includes a transversal movement mechanism 136 for moving the pair of lugs 134 towards and away from each other. In operation, each of the foldable blanks 190 received at the receiving end $E_R$ of the first conveyor 120 is first clamped by the clamping means 122, then erected by the erecting means (not shown) and then shaped to form into the package 150 of the desired shape at the shaping station 130, while being conveyed from the receiving end $E_R$ of the first conveyor 120 towards the output end $E_O$ of the first conveyor 120.

Figure 2A:
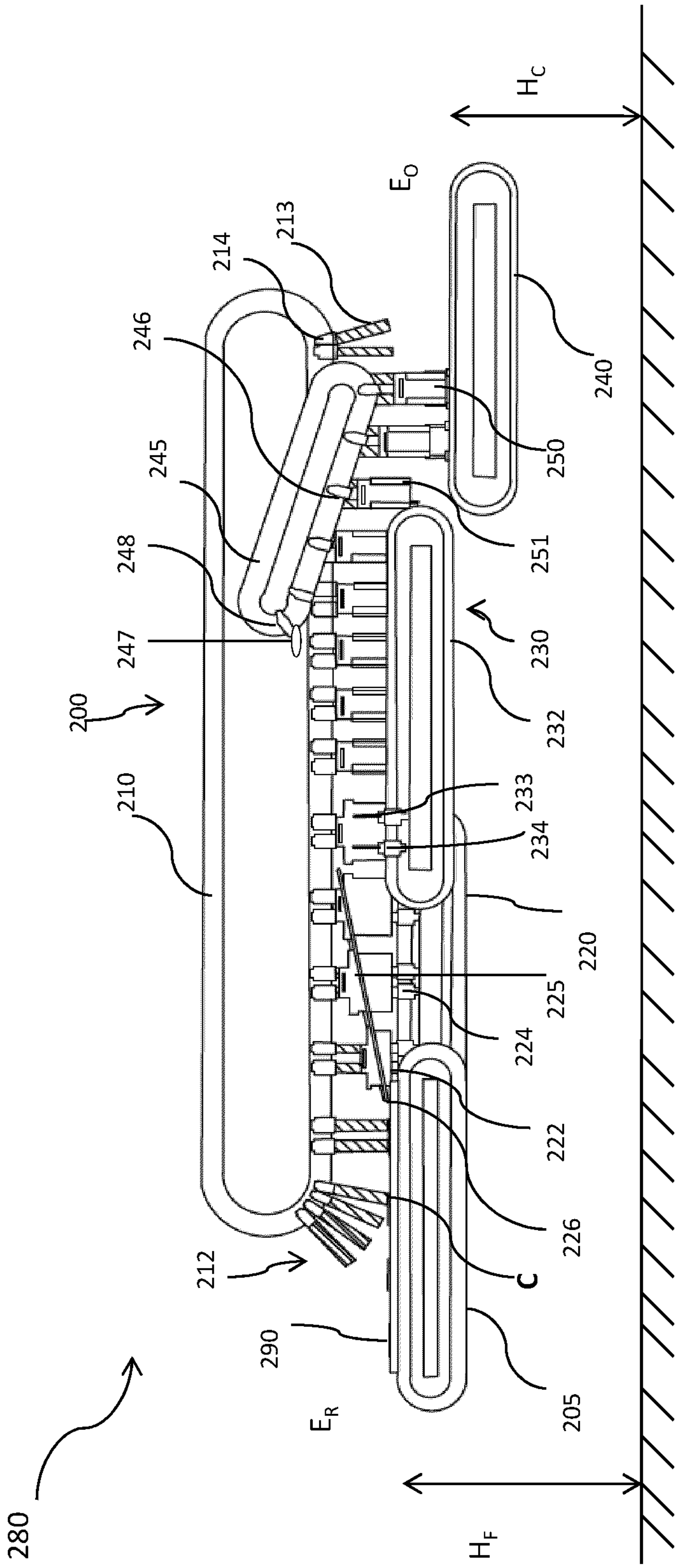
FIG. 2*a* illustrates a front view diagram representing an exemplary shaping tool for formation of packages having predetermined shape, in accordance with a preferred embodiment of the present invention.
Figure 3:
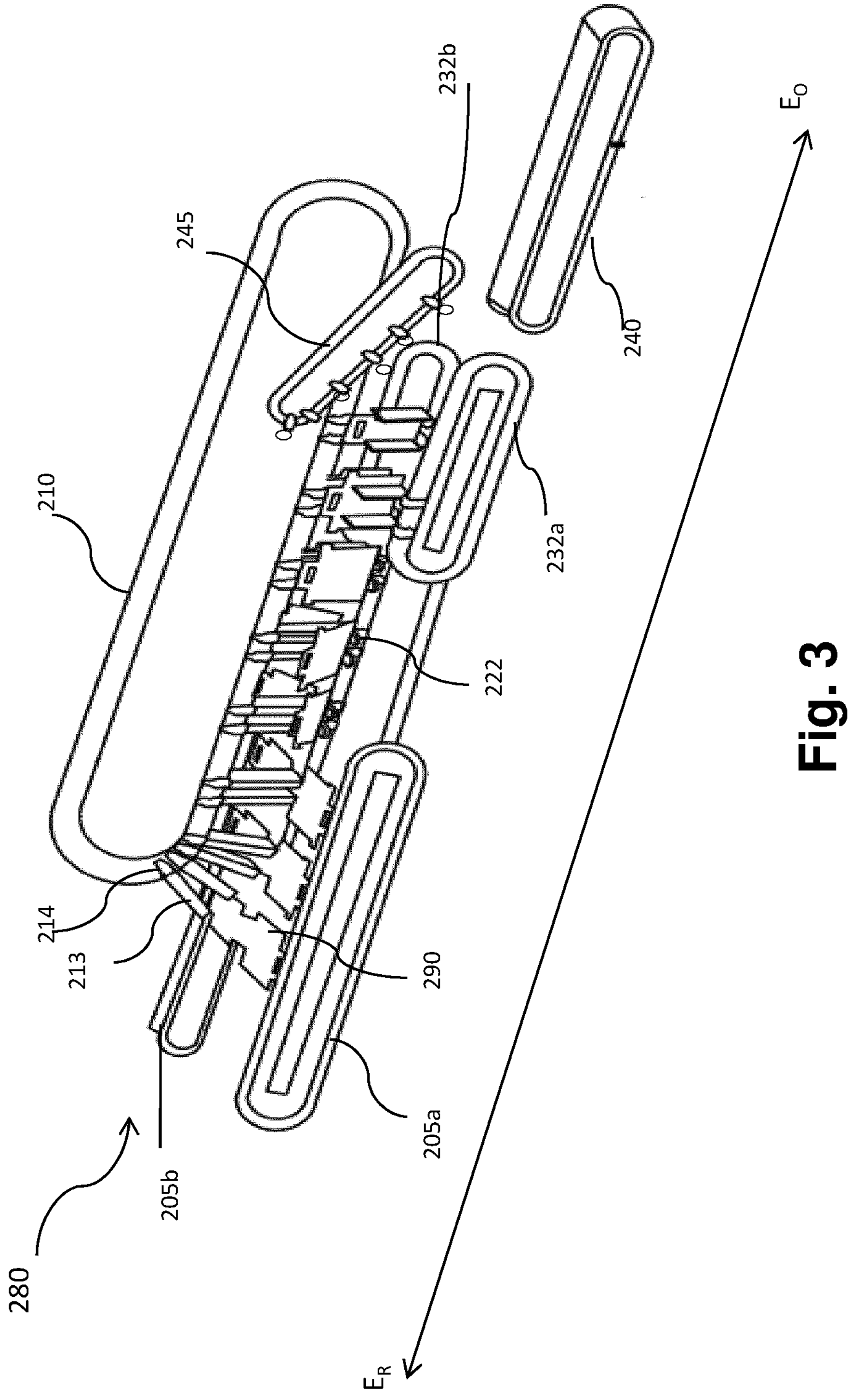
FIG. 3 illustrates a perspective view diagram representing an exemplary shaping tool for formation of packages having predetermined shape, in accordance with the preferred embodiment of the present invention.

In a preferred embodiment, as illustrated in FIG. 2*a*, an exemplary package forming system 280 having an incoming conveying line 205 carrying a continuous supply at variable, controllable pitch and pace, of foldable blanks 290 and employing a shaping tool 200 for shaping one or more contact portions of the secondary package 250, to be formed is provided. The conveying line 205 is generally an independent mover based conveying apparatus and in preferred embodiment includes two generally parallel oval tracks 205*a*, 205*b* as shown in FIG. 3, together adapted to facilitate a movement of a supply of foldable blanks 290 towards the shaping tool 200 of the current disclosure.

Figure 2B:
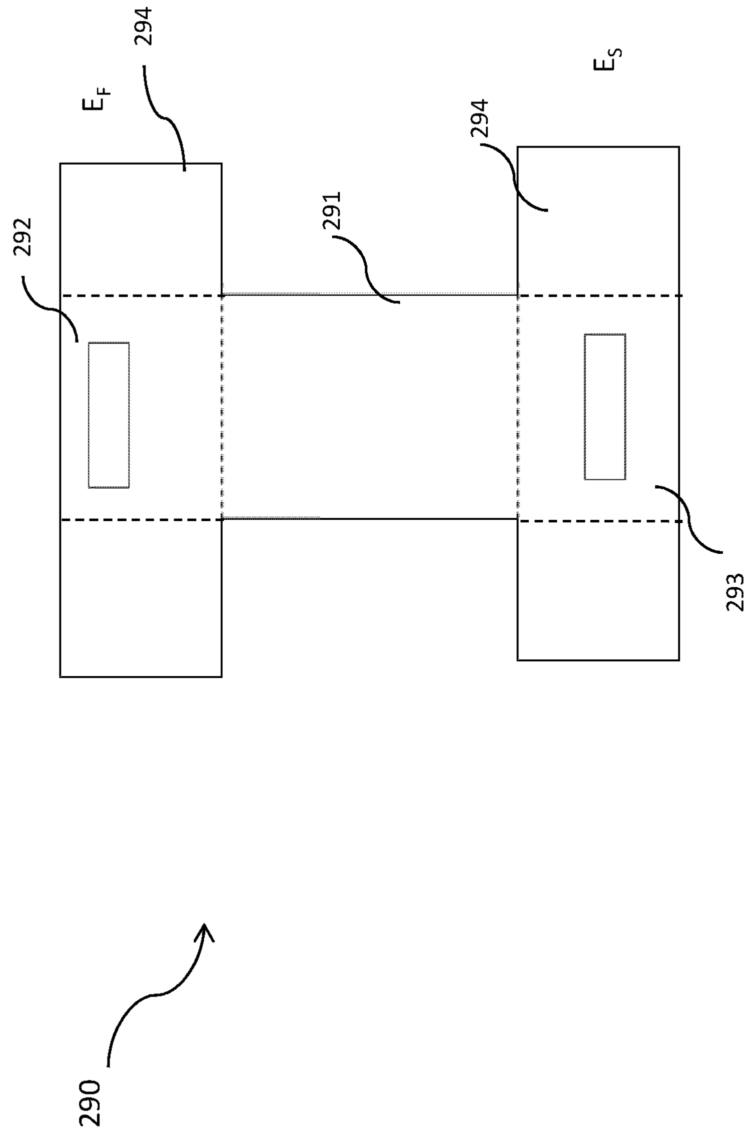
FIG. 2*b* illustrates an exemplary foldable blank, in accordance with a preferred embodiment of the present invention.

In a preferred embodiment, as illustrated in FIG. 2*b* the foldable blank 290 includes a bottom wall panel 291 extended between a first side panel 292 at a first end $E_F$ and a second side panel 293 at a second end $E_S$. The side panels 292, 293 of the foldable blank 290 are adapted to be fold around the bottom wall panel 291, to form the package 250 defining an inner surface (not shown) there within. Further, the at least one of the one or more side panels 292, 293 includes one or more side flaps 294 adapted to close the side panels 292, 293 thereof. Further in some embodiments, the one or more side flaps 294 of the foldable blank 290 includes one or more engaging mechanisms (not shown) to close the package 250 from the sides. The engaging mechanism may be selected from one or more of but not limited to notch based fixation mechanism, gluing, adhesive patches, retention tab, rivets, and any other suitable engaging mechanisms particularly which can be closed by using a pushing, latching or combination of push pull sequence, conventionally known in the art and suitable for use in current invention, without deviating from the scope thereof.

As disclosed earlier and shown in FIG. 2*a*, the shaping tool 200 includes an overhead conveyor 210 generally in the form of an oval track, having a plurality of independently, motion controlled, spaced apart counter-means 212 configured perpendicular to the track thereon and hence generally downwardly protruding when considering the lower portion of the track. The counter-means 212 is generally a support body adapted to support the foldable blank 290 during formation and during the shaping operation of the package 250 to be formed. Each of the counter-means 212 is movingly connected to the overhead track 210 through one or more independently, motion controlled counter movers 214 and each counter-means 212 may include one or more plunger means 213 Alternatively, the counter-means 212 may include any suitable mechanism conventionally known in the art for facilitating such an independent longitudinal movement across the overhead track 210. The one or more plunger means 213 may be a single plunger body to support the package 250 or otherwise may be a combination of a plurality of individual plunger bodies, arranged in a predetermined group configuration to support the package 250 during shaping operation. In some embodiments of the present invention, the one or more plunger means 213 may be replaced with any shaping body suitable for supporting the foldable blank 290 and the corresponding package 250 as disclosed above.

The shaping tool 200 further includes a first conveyor 220 adapted to receive the supply of the foldable blanks 290 from the incoming conveying line 205. The first conveyor 220 is generally positioned below the overhead track 210 and extending between a receiving end $E_R$ towards an output end $E_O$.

The first conveyor 220 includes a plurality of independently, motion controlled clamping means 222, each configured to be positioned below one of the downwardly protruding equally independently, motion controlled, counter-means 212 and adapted to clamp one of the foldable blank 290 there between.

Figure 7A:
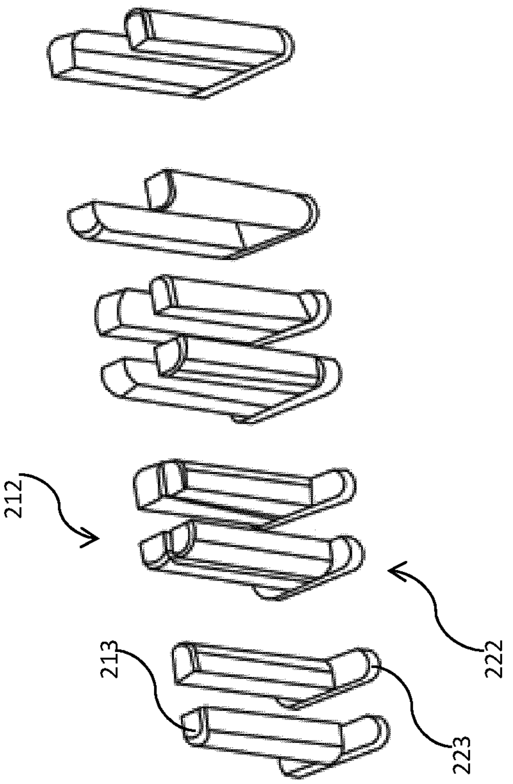
FIGS. 7*a*, 7*b* and 7*c* illustrates exemplary clamping means along with exemplary counter means, in accordance with the various embodiments of the present invention.
Figure 7B:
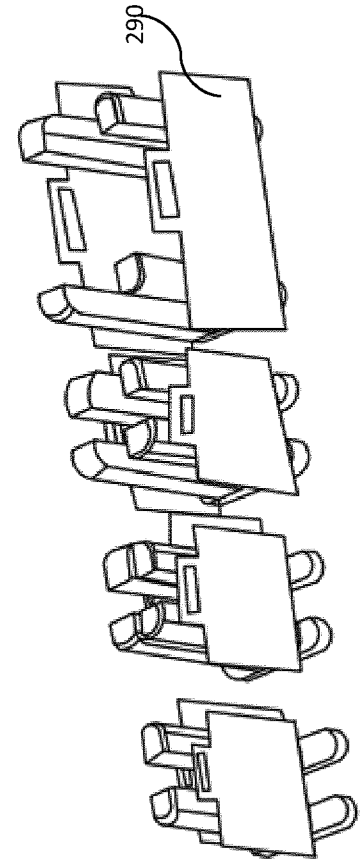
Figure 7C:
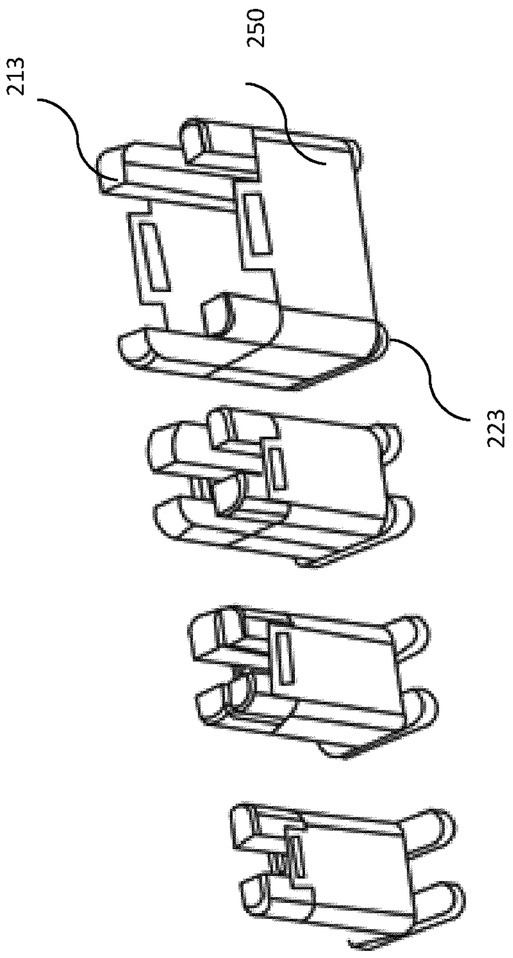

In a preferred embodiment, the clamping means 222 includes one more independently, motion controlled clamping plates 223, as shown in FIG. 7*a*, 7*b*, 7*c*, movingly configured onto the first conveyor 220 and positioned to receive the bottom wall panel 291 of the foldable blank 190 thereupon. Further, in a synchronized fashion, the one or more clamping plates 223 are adapted to meet one of the counter means 212 while being conveyed onto the first conveyor 220 such that the one or more clamping plates 223 and the corresponding counter means 212 facilitates a clamping of the bottom wall panel 291 there-between at a point of contact C (FIG. 2*a*). In some embodiments, the clamping means 222 further includes one or more independently, motion controlled clamping movers 224 adapted to movingly engage the one or more independently, motion controlled clamping plates 223 onto the first conveyor 220 thereby enabling an independent movement of each of the one or more clamping plates 223 onto the first conveyor 220, in a synchronized, independently motion controlled manner. Alternatively, the clamping means 222 may include any suitable mechanism conventionally known in the art for facilitating such an independent longitudinal movement of the one or more clamping plates 223 onto the first conveyor 220.

In some embodiments, the clamping means 222 may additionally be adapted to centrally position, or otherwise locate the foldable blanks 290 onto the first conveyor 220. In one such instances, the clamping means 222 includes one or more pin structures (not shown) and corresponding pin holes within the counter-means 212. Further, the foldable blanks 290, in such instances, also includes one or more holes, or combination of hole and slots, configured at a center portion thereof, such that when received onto the first conveyor 222, the foldable blank 290 is supported centrally by the connection between the pin of the clamping means 222 and the pin-holes of the counter-means 212 through the center holes, or combination of hole and slots, of the foldable blank 290. Alternatively, in other instances, the counter-means 212 includes one or more pin structure (not shown) and corresponding pin holes within the clamping means 222, such that when received onto the first conveyor 222, the foldable blank 290 is supported centrally by the connection between the pin of the counter-means 212 and the pin-holes of the clamping means 222 through the center holes, or combination of hole and slots or shape feature, of the foldable blank 290. Alternatively, in other embodiments, shaping tool 200 may include any suitable centering mechanisms conventionally known in the art.

In a preferred embodiment of the present invention as illustrated in FIGS. 7*a*, 7*b* and 7*c*, the number of clamping plates 223 is generally equal to a number of rows of the plunger means 213 such that each of the plunger means 213 within the same row is supported by one of the clamping plates. Further, the number of clamping plates 223, and the number of rows of plunger means 213, are optimized in accordance to the contact portions 251 to be shaped. In a preferred embodiment, the clamping means 222 include two clamping plates 223 for supporting a counter-means 212 having a plurality of plunger means 213, arranged in two rows.

Figure 6:
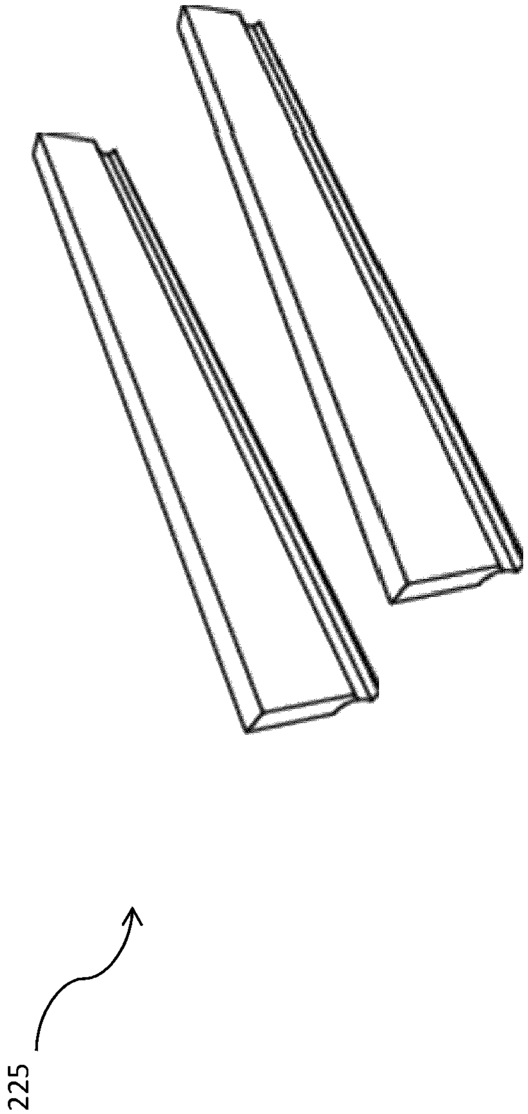
FIG. 6 illustrates an exemplary erecting means, in accordance with the preferred embodiment of the present invention.

The first conveyor 220 further includes an erecting means 225 for erecting each of the foldable blanks 290 received onto the clamping means 122 and clamped there-between the one or more clamping plates 223 and the corresponding counter-means 212, while being conveyed through the first conveyor 220 from the receiving end $E_R$ towards the output end $E_O$. In a preferred embodiment of the present invention, the erecting means 225 may include two parallel erecting rails, as illustrated in FIG. 6, and/or an articulated or compact folding mechanism, each positioned onto a different side of the first conveyor 220 and extending away from the point of contact C towards the output end $E_O$ in a generally vertically slanted configuration such that the each of the side panels 292, 293 of the foldable blank 290 gets gradually erected around the corresponding counter-means 212 while being conveyed onto the first conveyor 220 from the receiving end $E_R$ towards the output end $E_O$. In an embodiment of the present invention, each of the two or more erecting rails of the erecting means 225 is movingly connected to the first conveyor 220 using one or more erecting movers 226. Alternatively, the two or more erecting rails of the erecting means 225 are positioned, one on each side of the first conveyor 220 using any positioning mechanisms such as a manipulator, robotic arm, and the like. Yet alternatively, the positioning mechanism may include any conventionally known manual manipulation mechanism.

Figure 4:
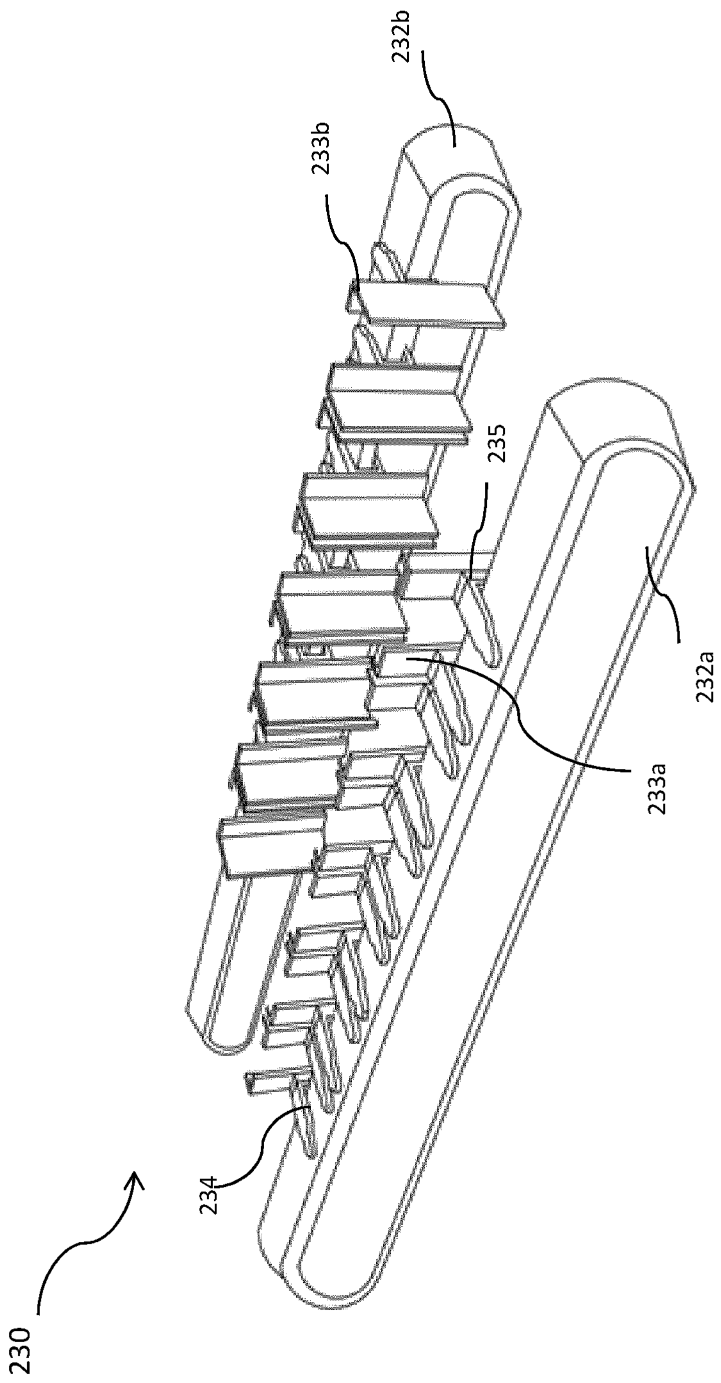
FIG. 4 illustrates a schematic diagram representing a shaping station of the shaping tool, in accordance with a preferred embodiment of the present invention.

The shaping tool 200 further includes a shaping station 230 extending away from the erecting means 225 towards the output end $E_O$ of the first conveyor 220. The shaping station 230 is generally adapted to receive the already erected foldable blank 290 and convert it into the package 250 having the desired shape at the one or more contact portions 251. As illustrated in FIG. 4, the shaping station 230 includes a pair of generally parallel shaping tracks 232, namely 232*a* and 232*b*, each positioned on a different side and generally parallel to the first conveyor 220 and extending away from the erecting means 225 towards the output end $E_O$. The generally parallel shaping tracks 232 include a plurality of pairs of independently movable shaping lugs 233 adapted to support the already erected foldable blank 290 including the corresponding counter-means 212 there-between the shaping tracks 232.

Each of the pair of shaping lugs 233 is configured in a predetermined profile in accordance to a desired shape to be configured onto the one or more contact portions of the secondary package 250 to be formed. Accordingly, the predetermined profile of each of the shaping lugs 233 is of a shape complementary to the desired form that needs to be provided to the contact portion of the package 250. For example, in a preferred embodiment, the desired form is a cuboidal shaped package 250 with generally rounded corners. In such an embodiment, the profile of lugs 233 is generally arc shaped and the contact portion 251 is the portion of the foldable blank 290 corresponding to the corners thereof. In such an embodiment, two pairs of the movable lugs 233 are adapted to be utilized for forming and shaping a single package 250. However, in other embodiments, any number of pair of movable shaping lugs 233 may be utilized in accordance to the shape of the package 250 to be formed, the contact portions 251 to be shaped, and the desired form.

In a preferred embodiment, the plurality of pair of lugs 233 includes a first lug 233*a*, and a second lug 233*b* are movably connected to the generally parallel shaping tracks 232*a* and 232*b* through a plurality of independently, motion controlled shaping movers 234 and is adapted to receive the foldable blank 290 along with the corresponding counter-means 212 there-between. Further, each of the plurality of independently, motion controlled shaping movers 233 is movingly connected to one of the shaping tracks 232 such that an independent longitudinal movement of each of the lugs 233 along the corresponding shaping tracks 232 is made possible. Such an independent movement of the shaping movers 234 allows the possibility of forming and in turn shaping the packages 250 into asymmetrical shaped packages.

Figure 5:
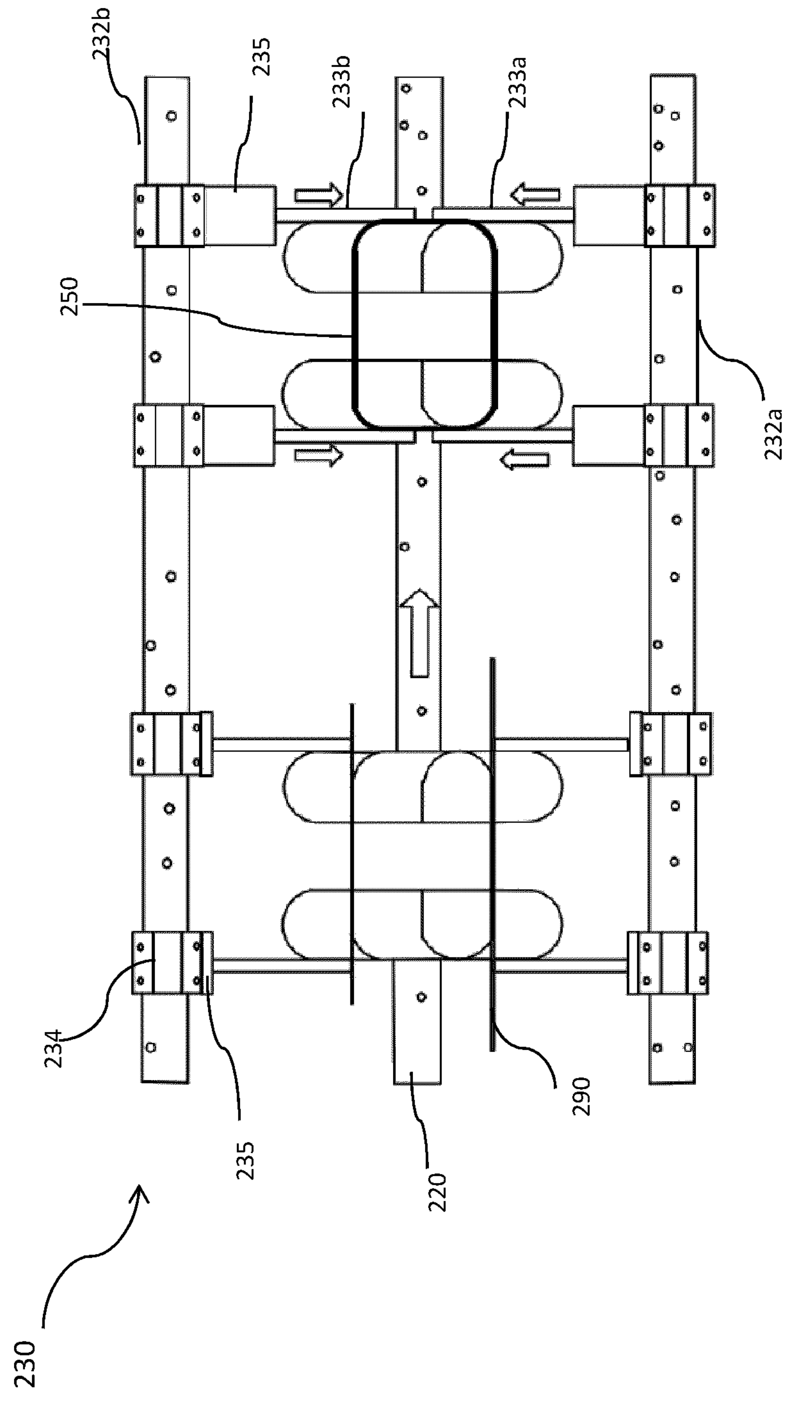
FIG. 5 illustrates an exemplary shaping operation, in accordance with the preferred embodiment of the present invention.

The shaping station 230 further includes a transversal and/or pivotal moving mechanism 235 for facilitating a transversal and/or pivotal movement of each of the first shaping lug 233*a*, and a second shaping lug 233*b* towards and away from each other (FIG. 5*a*). In the preferred embodiment as disclosed above, the transversal moving mechanism 235 includes an extension means adapted to be positioned between each of the movers 234 and the corresponding shaping lug 233 and enables an movement of each lug of the pair of lugs 233 in a direction towards and away from each other, perpendicular or otherwise nearer or further away from the track.

Figure 9:
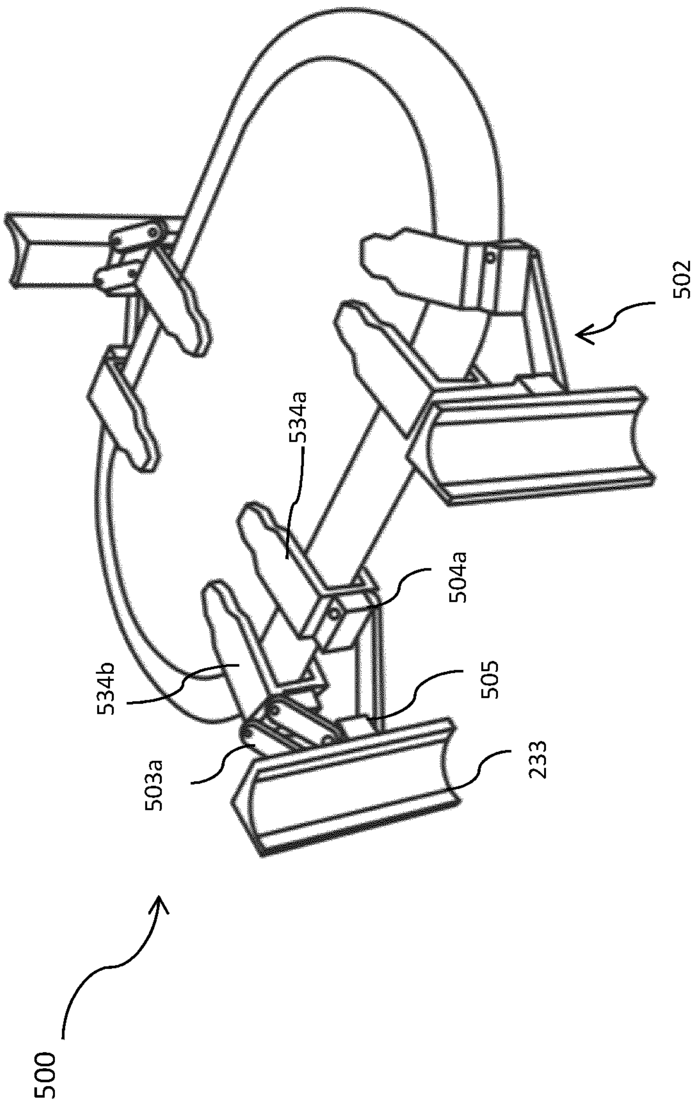
FIG. 9 illustrates an exemplary an articulated movement assembly assembly, in accordance with the preferred embodiment of the present invention.

In a preferred embodiment, the extension means may include an articulated movement assembly 500 as illustrated in FIG. 9. In such an embodiment, each of the pair of shaping lugs 233*a*, 233*b* is connected to a pair of shaping movers 234, pivotally and movably attached to each other through one or more articulated mounting brackets 502. The articulated bracket 502 is a conventionally known mounting bracket having a first attachment bracket 503 connected to a second attachment bracket 504 at their distal ends such that the articulated bracket 502 has three open ends, i.e. a first open end 503*a* at a proximal end of the first attachment bracket 503, a second open end 504*a* at the proximal end of the second attachment bracket 504 and a pivotally movable center end 505.

As illustrated in FIG. 9, the articulated movement assembly 500 includes a first articulated mover 534*a* connected to a second articulated mover 534*b* through the articulated mounting brackets 502, each of the movers 534*a*, 534*b* connected at one of the open ends 503*a*, 504*a* of the articulated bracket 502, such that the articulated bracket 502 is pivotally movable in a generally transversal plane throughout the longitudinal range of motion of the first articulated mover 534*a* and the articulated second movers 534*b*, towards and/or away from each other. The articulated assembly 500 is connected to the shaping lug 233 at the pivotally movable center end 505 thereof. Optionally, the articulated movement assembly may include a third mover connected to the shaping lug via a mounting bracket to control the angle of approach of the shaping lug and enable a final few degrees of rotation of the shaping lug to clamp and then pivot and tend to mold or stretch the packaging material about the counter-means to achieve a tight pack and optimum pack quality.

In a collapsed position, where the articulated mounting bracket 500 is closed, such that each of the pair of pivotally connected articulated movers 534*a*, 534*b* are oriented in a substantially coinciding position, the shaping lug 233 is at its initial position. In an opened position, where the articulated mounting bracket 500 opens up pivotally, the pair of the articulated movers 534*a*, 534*b* may be moved towards/away from each other such that the corresponding shaping lug 233*a* is moved transversally/pivotally towards/away from the opposite shaping lugs 233*b*.

It is to be contemplated that the one skilled in the art will recognize that the articulated movement assembly 500 having the pair of articulated movers 534*a*, 534*b* pivotally connected for longitudinal movement in a generally horizontal plane in a conventional manner. The articulated movement assembly 500 is movingly supported on to the shaping tracks 232 such that a horizontal movement of the movers 534*a*, 534*b* towards/away from each other is possible. Such a movement of the pair of articulated movers 534*a*, 534*b* provides operative power for manipulating the articulated assembly 500 and therefore enables the movement of the mounting bracket between 502 its collapsed position and its open position, thereby enabling a range of transversal/pivotal extension along with an longitudinal movement of the shaping lugs 233 onto the corresponding shaping track 232. Further, it is to be contemplated that the articulated movers 534 are same as the shaping movers 234 disclosed across the current disclosure.

Therefore, by appropriate manipulation of the first articulated mover 534*a*, the second articulated mover 534*b*, and therefore the articulated assembly 500, the shaping lug 233 can be positioned at any desired distance away from the shaping tracks 232, while moving the shaping lug 233 in an operative orientation generally in a transversal and/or horizontal direction.^

In yet other embodiments, the extension means may be selected from any suitable conventionally known extension mechanism already known in the art.

In some embodiments of the present invention, loaded products and counter-means which fill the voids between the neck areas of the primary packaging and the contact zones of the foldable blanks are used in the package formation. In this case, the first conveyor 220 is adapted to receive already formed packages 250, and pre-loaded with beverage containers (not shown) such as bottles, or the like, in a predetermined arrangement, so as to support the package 250 from inside and in accordance to the desired shape. In such embodiments, the counter-means 212 includes a plurality of independently, motion controlled plunger means 213 having a shaping body configured to be received onto a neck portion of each of the beverage containers. Further, in such embodiments, the shaping tool 200 does not require clamping means 222 and erecting means 225 since an already formed package is received at the first conveyor 220. Additionally, in such embodiments, the shaping station 230 receives the already formed package 250 and shapes the contact portions 251 thereof in accordance to the desired form.

In some embodiments of the current disclosure, the shaping tool 200 includes a receiving conveyor 240 adapted in an independent, motion controlled manner to synchronize and receive the supply of secondary package 250 already formed and shaped from the supply of foldable blank 290, in accordance to the predetermined shape from the first conveyor 220. The receiving conveyor 240 is generally an outgoing oval track positioned at a height $H_C$ lower than a height $H_F$ of the first conveyor 220 and extends away from its output end $E_O$.

Further in such embodiments, the shaping tool 200 may furthermore include a generally slanted independently, motion controlled conveyor 245 positioned at a height $H_S$ generally higher than the height $H_F$ of the first conveyor 220. The slanted conveyor 245 is adapted to pick up the already formed packages 250 from the independently, motion controlled first conveyor 220 and deliver towards the independently, motion controlled receiving conveyor 240, in a variable yet controlled and synchronized manner. The slanted conveyor 245 includes a plurality of independently, motion controlled spaced apart picking means 246, each adapted to pick up one of the shaped package 250 from the first conveyor 220. The picking means 246 includes a generally, hook shaped pickers body 247 adapted to hook up the package 250 at one or more portion selected from but not limited to handle, flaps, and the like. In some embodiments of the present invention, each of the picking means 246 further include a picking mover 248 adapted to movingly connect the picker body 247, downwardly onto the slanted conveyor 245. Alternatively, the picking means 246 may include any suitable mechanism conventionally known in the art for facilitating such an independent longitudinal movement of the picking body 247 longitudinally across the overhead slanted conveyor 245. In some embodiments of the present invention the picking means 246 may be any suitable mechanism conventionally known in the art.

In some other embodiments, slanted conveyor 245 may be a generally horizontally tilted conveyor belt (not shown) adapted to pull away each of the packages 250 frictionally away from the corresponding counter-means 212 and deliver towards the receiving conveyor 240. In yet other embodiments, the slanted conveyor 245 may be formed in any suitable configuration so as to receive the packages 250 from the first conveyor 220 and deliver it towards the receiving conveyor 240. Pulling away may also be achieve by suction means (eg. suction cups).

Figure 10A:
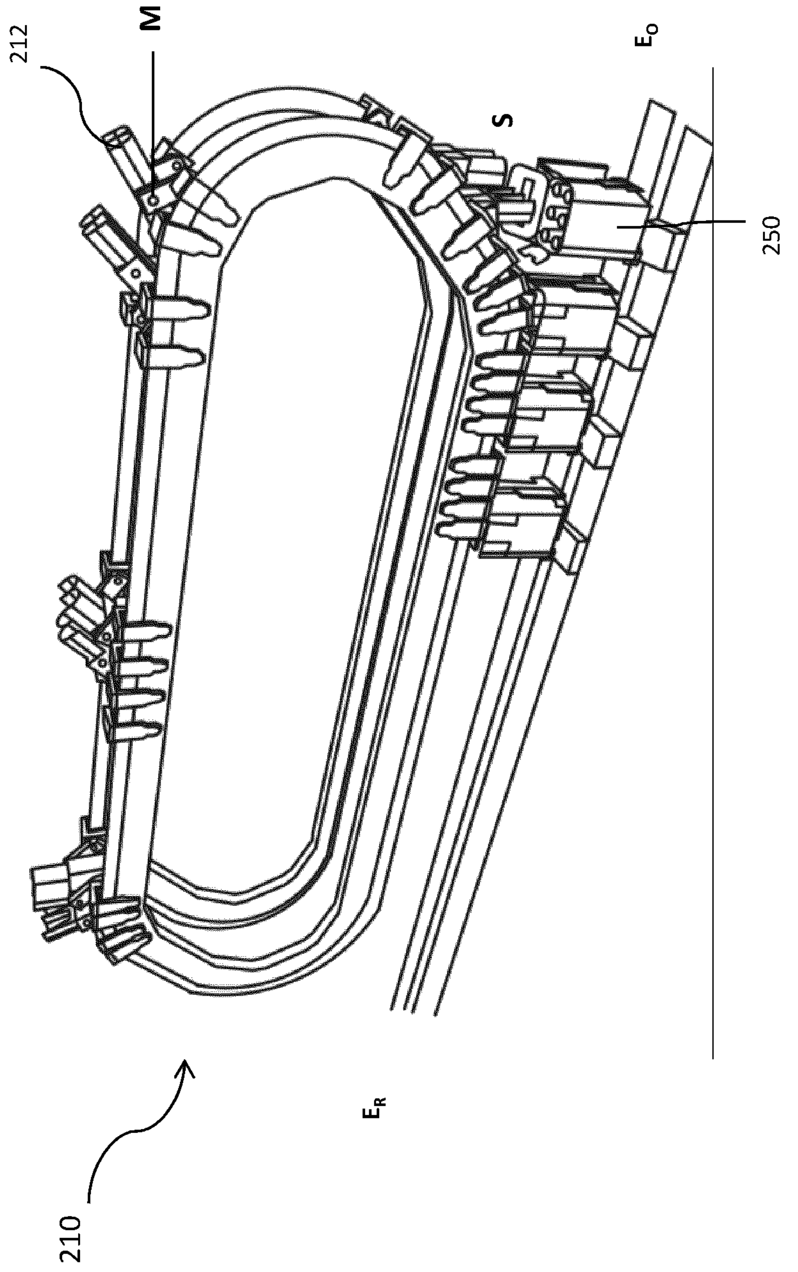
FIG. 10*a* illustrates an exemplary overhead conveyor, in accordance with an exemplary embodiment of the present invention.

Alternatively, in some embodiments, the shaping tool 200 may not require slanted conveyors 245 for delivering the package 250 towards the receiving conveyor 240. In such embodiments, in some instances, the overhead conveyor 210 may be adapted to lift up the counter-means 212 and/or push down the packages 250 away from the counter-means 212 such that the package 250 is separated from the counter-means 212 before it is received onto the receiving conveyor 240. For example, as illustrated in FIG. 10*a*, the overhead conveyor 210 having a generally slanted upside S towards the output end $E_O$ is provided. Further, the counter-means 212 are mounted at a fixed predetermined angle relative to the counter movers 214 such that the counter-means 212 vertically moves out of the package 250 when travelling upwardly at the slanted up side S of the conveyor 210, and therefore, the package 250 is conveniently received at the receiving conveyor 240. The counter-means 212, in such embodiments may include mounting means M for maintaining the fixed predetermined angle between the counter mover 214 and the counter-means 212.

Figure 10B:
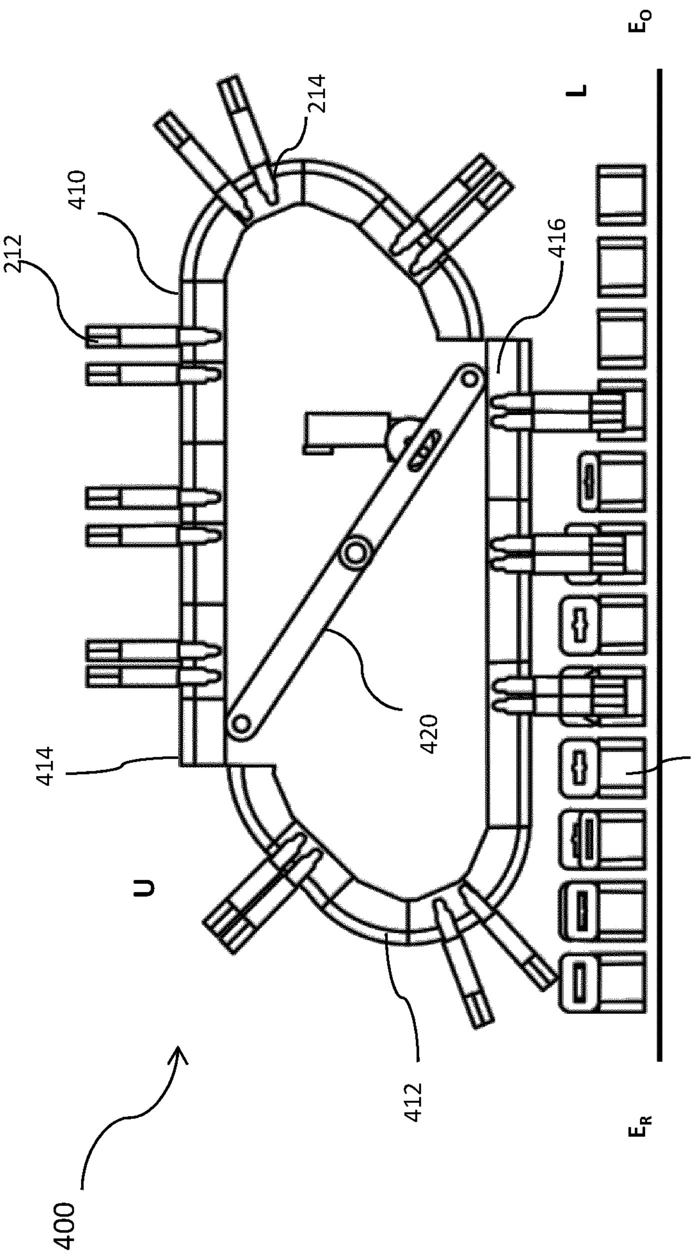
FIGS. 10*b* and 10*c* illustrates another exemplary overhead conveyor, in accordance with another exemplary embodiment of the present invention.
Figure 10C:
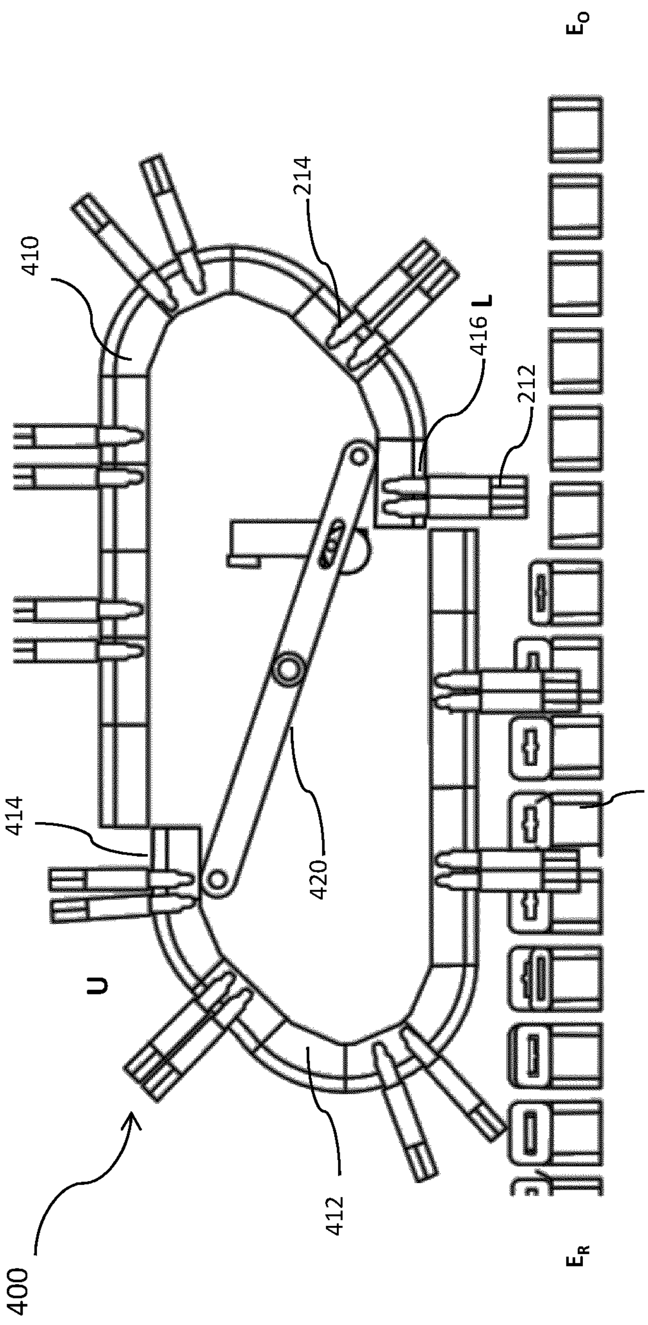

In another example, as illustrated in FIGS. 10*b* and 10*c*, the overhead conveyor 210 is a modular conveyor 400 formed of a stepped up conveyor part 410 and a stepped down conveyor part 412 disconnected at an upper region U as well as a lower region L, adapted to be connected to each other by a step down link 414 at the upper connection region U and a step up link 416 at the lower region L thereof.

Further, the modular conveyor 400 includes a central lever 420 for enabling either a connecting or a disconnecting movement of the one of the step-down link 414 and/or step up link 416 simultaneously at the same time.

In operation, the counter-movers 214 when moving longitudinally onto the modular conveyor 400, steps down from the stepped up conveyor part 410 onto the stepped down conveyor 412 through the step down link 414 as illustrated in FIG. 10*a*, where the step-down link 416 is first moved up to receive the counter-mover 214 thereon and then moved down to transfer the counter-means 214 onto the stepped down conveyor 414. Thereafter, the counter-means 212 is received within the package 250 while moving from the receiving end $E_R$ towards the output end $E_O$.

Further, the counter-means 212 is lifted out of the secondary package 250, as illustrated in FIG. 10*c*, when the counter-mover 214 is moved up from the stepped down conveyor 412 towards the stepped up conveyor part 410 through the step up link 416, such that the package 250 is separated from the counter-means 212, before it is received onto the receiving conveyor 240. The central lever 420 in such an embodiment is adapted to provide an upward/downward movement to each of the step down link 414 and/or the step up link 416, thereby enabling the connection/disconnection of the stepped up conveyor part 410 and the stepped down conveyor 412 continuously and/or intermittently such that a continuous operation of the shaping tool 200 is achieved.

In yet other examples, the receiving conveyor 240 may be provided with one or more pulling means (not shown) adapted to pull the package 250 away from the counter-means 212 and receiving the secondary package 250 thereupon. Further in all such examples, the height $H_S$ of the receiving conveyor 240 is generally same as the height $H_F$ of the first conveyor 220.

The shaping tool 200 further includes a first powering means (not shown) for enabling a movement of the one or more incoming tracks 205, the first conveyor 220, each of the parallel shaping tracks 232, the overhead conveyor 210 the receiving conveyor 240 and the slanted conveyor 245, and various sub-components thereof. In a preferred embodiment, the first powering means is a linear servo motor, or other conveying or transfer mechanism enabling independent motion control of each mover, adapted to move each of the one or more movers on the incoming tracks 205, the first conveyor 220, each of the parallel shaping tracks 232, the overhead conveyor 210 the receiving conveyor 240 and the slanted conveyor 245 at a first predetermined pitch facilitating a continuous operation of each of the component of the shaping tool 200 such that the incoming supply of the foldable blanks 290 is continuously formed into packages 250 of the desired shaped. However, in other embodiments, the first powering means is a linear servo motor, or other conveying or transfer mechanism enabling independent motion control of each mover, adapted to move each of the one or more movers on the incoming tracks 205, the first conveyor 220, each of the parallel shaping tracks 232, the overhead conveyor 210 the receiving conveyor 240 and the slanted conveyor 245 at a synchronized dynamically variable pitch facilitating a pseudo-continuous operation of each of the components of the shaping tool 200 such that the incoming supply of the foldable blanks 290 is formed into packages 250 of the desired shaped, in a pseudo-continuous and controlled operation. In all such embodiments, the slanted conveyor 245 is adapted to move at a second pitch, generally lesser than the first pitch, relative to the overhead conveyor 210 such that counter means 212 of the overhead conveyor 210 is freed from the package 250 while it is received onto the receiving conveyor 240.

Figure 8:
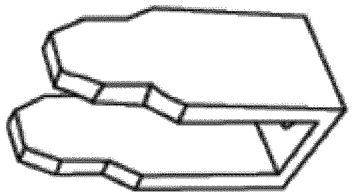
FIG. 8 illustrates an exemplary mover, in accordance with the preferred embodiment of the present invention.

Further in some preferred embodiments, the shaping tool 200 includes a second powering means (not shown) for enabling a movement of each of the movers including, the counter movers 214, the clamping movers 224, the erecting movers 226, the shaping movers 234, the articulated movers 534, and the picking movers 248 independently along the corresponding tracks. In a preferred embodiment, the first powering means is linear servo motor, or other conveying or transfer mechanism enabling independent motion control of each mover. In such an embodiment, the linear motor, specifically, is a generally moving magnet type of motor conventionally known in the art. Further in such embodiments, the linear motor utilizes the corresponding conveying tracks as a stator and each of the movers as a rotor thereof. In such an embodiment, each of the oval tracks include an interior portion accessible through an open end. The oval tracks further include a plurality of coils fixedly arranged in a longitudinal direction within the interior portion thereof. Further in such embodiments, as illustrated in FIG. 8, each of the movers 214, 224, 226, 234, 248, is similar in configuration and is generally in the form of a U shaped magnetic yoke having a permanent magnet positioned there within on mutually facing inner sides thereof such that when positioned onto the corresponding tracks, each of the of the yoke forms a magnetic circuit and said stator being positioned between the permanent magnets. Further, each of the counter movers 214, 224, 226, 234, 248 include a sliding mechanism such as a roller, or the like, supported by one or more roller-supporting portions formed at lower ends of the corresponding oval tracks. In operation when current is passed through the stator, a uniform magnetic field is generated and on the basis of polarity of permanent magnets, a movement of each of the movers 214, 224, 226, 234, 248 is achieved. Further, the acceleration, speed, direction, position, applied force and other parameters may be controlled in accordance with the direction, intensity, etc of the flow of the current applied thereupon.

In other embodiments, the movers 214, 224, 226, 234, 248 are utilized as stator whereas the oval tracks are utilized as the rotors. In such an embodiment, each of the movers 214, 224, 226, 234, 248 includes built in coils and each of the corresponding tracks include a plurality of magnets configured thereon in a longitudinal direction such that the movers are able to come into an electromagnetic interaction thereby enabling a movement thereof.

The shaping tool 200 may include one or more control units (not shown) for managing the operations thereof, and particularly for managing the working of the first powering means and/or the second powering means and more particularly the movement of the shaping movers, so as to optimize the sequence of the longitudinal and/or transversal movement of the shaping lugs 233 in a predetermined and synchronized sequence. The predetermined sequence is particularly required to be evaluated in the instances where a specific predetermined design has to be shaped onto the one or more contact portions of the package 250.

In some embodiments, the control unit may include an input unit for receiving the predetermined desired shape parameters of the package 250 to be formed at the shaping station 230. Further, the control unit may include a plurality of sensors (not shown) for tracking the parameters such as for example, position of the package and/or foldable blanks to be shaped, width and/or height of the packages, or the like. The control unit may further include a processor unit for processing the data captured by the input unit on the basis of predetermined logics/rules for facilitating the movement of the plurality of movers 214, 224, 226, 234, 248, 254. The control unit may further include an instruction unit that delivers the instructions to various components such as various powering means, linear motors, motors, driving units, or the like, to facilitate a desired smooth and synchronized operation.

FIG. 2 and FIG. 3 schematically show the arrangement of the basic components of the shaping tool 200 of the present invention. However, in the construction of commercial functional units, secondary components such as couplers, connectors, support structure and other functional components known to one of skill in the field of shaping tools and more particularly the shaping tools for secondary package for use with conveyor systems, may be incorporated within the shaping tool 200. Such commercial arrangements are included in the present invention as long as the structural components and arrangements disclosed herein are present. Accordingly, it is to be contemplated that the shaping tool 200 may be configured to be used for any kind of secondary packages of any possible shape as deems possible without deviating from the scope of the current invention.

In a preferred embodiment, the foldable blank generally represented by the numeral 290, is generally formed from a recyclable material selected from one or more of but not limited to any desired material such as including all kind of papers, fiberboard, corrugated board, laminated board, hybrid material, or any combinations thereof, any known housing formed by any known mechanism and suitable for use in accordance with the current disclosure without deviating from the scope thereof, may be used. Further, the shape and size, including the height of the package 250 to be formed, may be varied depending on the design constraints and requirements for its application. For example, within the instances when the package 250 is adapted to house twelve (beverage) containers in one layer in a 3×4 arrangement the carton is dimensioned accordingly. Further, in other instances, the carton may be sized and shaped to hold containers of a different or same quantity in a single layer or in more layers, and/or in different row/column arrangements (e.g., 1×6, 3×6, 2×6, 4×6, 2×3×4, 2×6×2, 2×9, 3×5, 3×5×2, 4×5×3, etc.). Further, in yet other instances, the packages 250 may be formed in various possible symmetrical as well as asymmetrical shapes such as tapered, oval, rhombus, and the like. Furthermore, the package 250 may be formed into any possible height in accordance to the utility and other design constraints.

In some embodiments, the foldable blank 290 may be made of a light weight plastic material selected from one or more of but not limited to plastic material such as group of thermoplastics including acetal, acrylic, cellulose acetate, polyethylene, polystyrene, vinyl, and nylon.

Figure 11A:
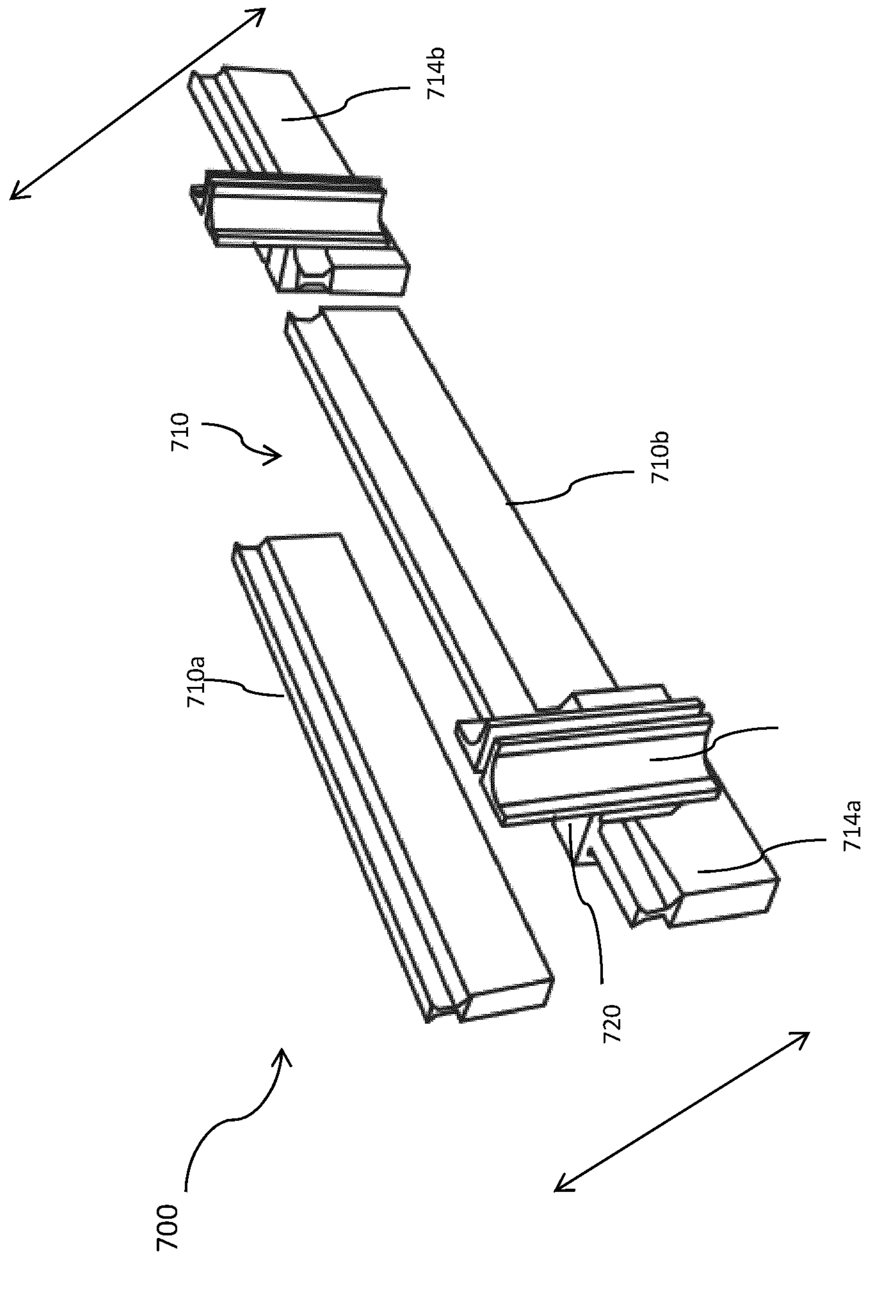
FIGS. 11*a* and 11*b* illustrates a virtual close loop conveyor, in accordance with an exemplary embodiment of the present invention.
Figure 11B:
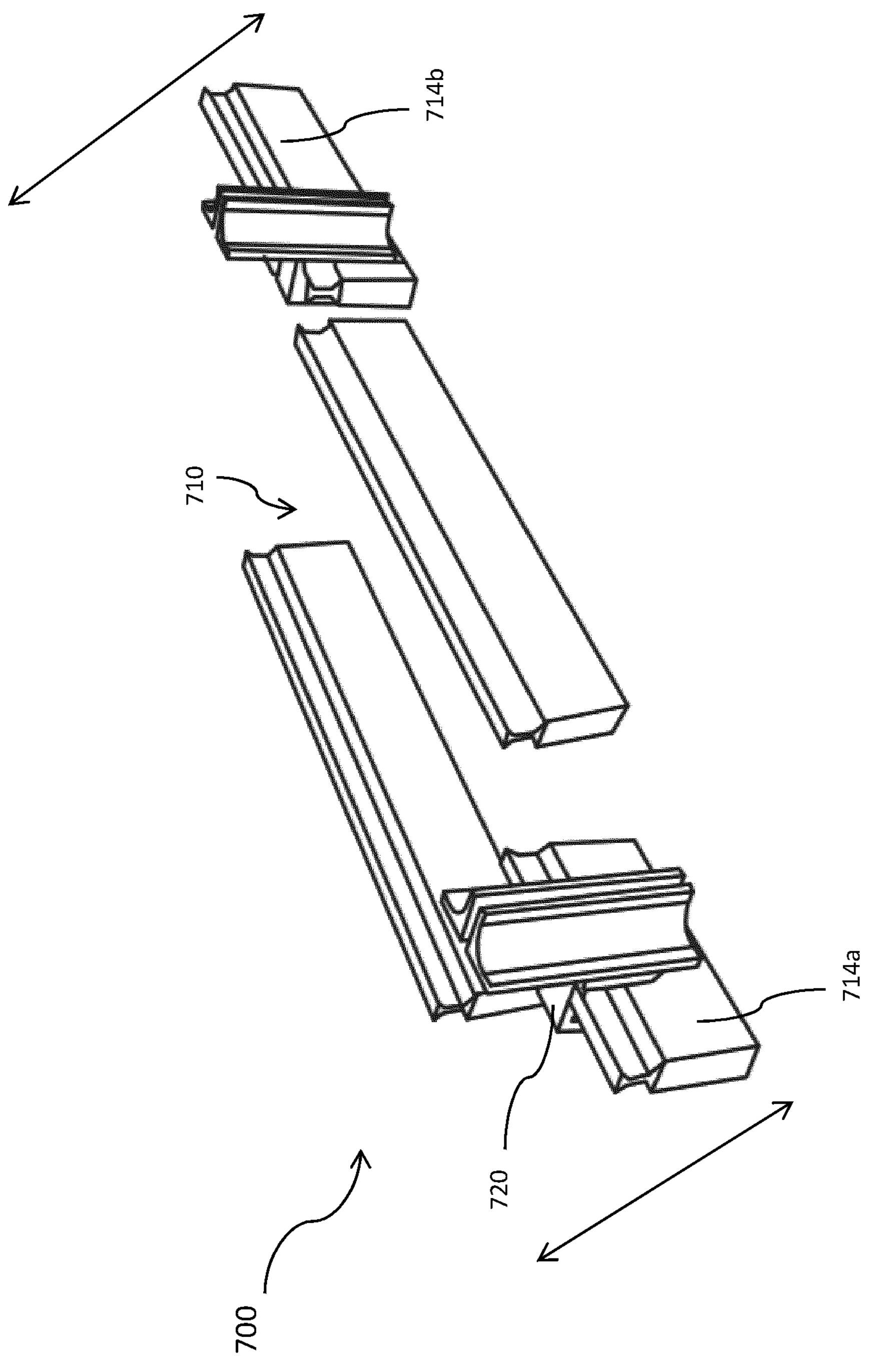
Figure 11C:
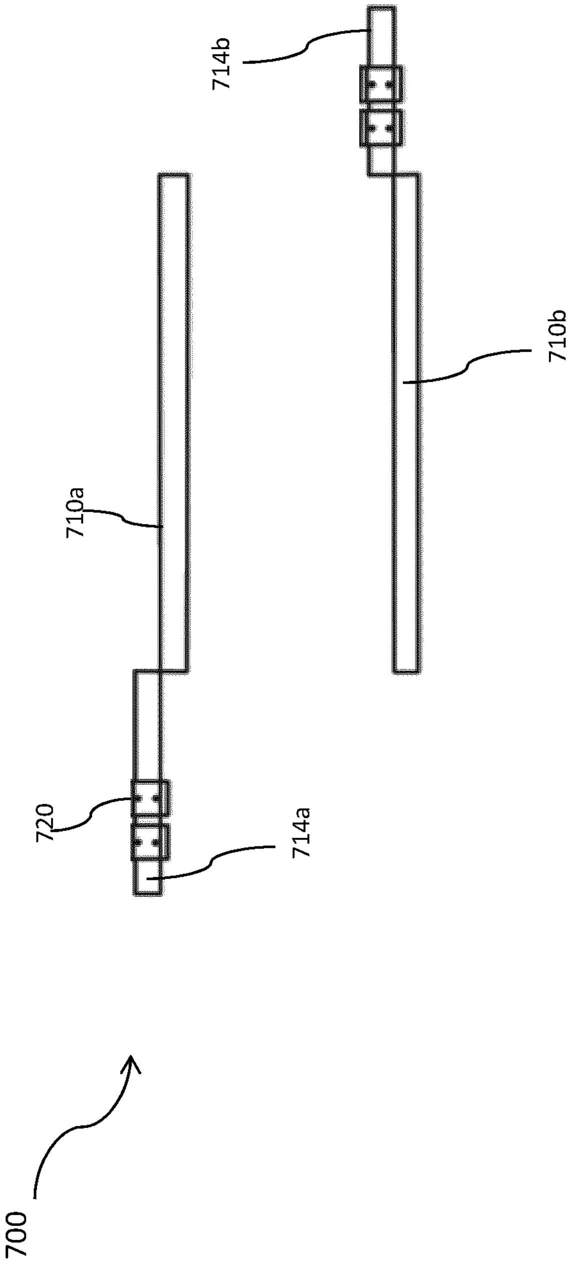
FIG. 11*c* illustrates a top view of the virtual close loop conveyor, in accordance with an exemplary embodiment of the present invention.

In a preferred embodiment of the present invention, each of the conveyors enabling independent motion control of the shaping tool 200 including the overhead conveyor 210, the first conveyor 220, the shaping station 230 including each of the parallel shaping tracks 232 and the slanted conveyor 245 is generally a horizontally or vertically positioned oval track conventionally known in the art. The orientation of the oval tracks so arranged relative to each other so as to realize the functions and adjustable range of the machine within as compact a space as possible. In yet other embodiments of the present invention, each of the conveyors of the shaping tool 200 including the overhead conveyor 210, the first conveyor 220, the shaping station 230 including each of the parallel shaping tracks 232 and the slanted conveyor 245 may be configured as a virtual closed loop conveyor as illustrated in FIGS. 11*a*, 11*b* and 11*c*. The virtual closed loop conveyor 700 includes a pair of central conveying portions 710 namely 710*a*, 710*b*. The virtual closed loop conveyor 700 further includes a pair of shiftable conveying portions 714*a*, 714*b*, one on each side of the pair of central conveying portions 710, and adapted to move back and forth, so as to be able to connect to one of the central conveying portions 710, such that one or more movers 720 are able to smoothly move towards and away onto the corresponding central conveying portion 710 and the connected shiftable conveying portion 714*a*, 714*b*. Such a configuration allows a possibility to position each of the movers 720 at any desired position onto the virtual closed loop conveyor 700 without actually requiring completing an entire revolution as need to be done in conventional oval tracks.

In use, as disclosed above, the shaping tool 200 is adapted to receive a continuous supply of the foldable blanks 290 which are first erected while being supported by the counter-means 212, and then formed into the corresponding packages 250 by action of the opposite lugs 233*a* and 233*b* of the shaping station 230, which are configured to push the erected foldable blanks 290 in a predetermined sequence and at each of the contact portion 251 to be shaped thereof. Further, the pushing sequence is optimized for closing the one or more side flaps 294 of the foldable blank 290 using the one or more engaging mechanism and thereby forming the package 250 of the desired predetermined shape.

To achieve the range of the machine the position of the independent motion controllable conveyors of the shaping tool 200 including the overhead conveyor 210, the first conveyor 220, the shaping station 230 including each of the parallel shaping tracks 232 and the slanted conveyor 245 relative to the machine datum may be adjusted. i.e. 2D adjustment in height (vertically) and/or in width (horizontally).

In a preferred embodiment, each of the plunger means 213 of the counter means clamps the bottom wall panel of the foldable blank at one of the clamping plate of the clamping means. Clamped foldable blanks 290, while being conveyed onto the first conveyor 220, then come in contact with either two parallel rails of the erecting means 225 such that the side panels 292, 293 of the foldable blanks 290 are gradually erected around the counter-means 212, or come into contact with a driven, foldable blank folding mechanism to fold the side panels 291 and 292 about the counter-means 212 in a short distance. Erected and clamped foldable blank 290 is received then between the parallel shaping tracks 232 such that one or more pairs of lugs 233, comes in contact with the contact portions 251, such that the counter-means 212 is supporting the contact portions 251 from inner side of the foldable blank 290. Then the control unit optimizes the movement of the one or more pair of lugs 234, in a longitudinal and/or a transversal direction, and in a predetermined sequence in accordance to the desired shape such that a pushing sequence is applied to the contact portions 251 of the foldable blank such that the package 250 having the predetermined desired shape at the contact portions 251 is formed. In a preferred embodiment of the present invention, two pairs of lugs 233, each having an arc shaped are adapted to provide a rounding shape to the each of the four corners of the foldable blank 290. However, in other embodiments, any number of pair of lugs 233, may be used in accordance to the shape of the package, and to provide a desired shape to the contact portions 251. Then the one or more side flaps 294 are closed by engaging the engaging mechanism. This is achieved by optimizing and additional movement of the one or more pair of lugs 233 in a predetermined sequence such that a controlled manipulation is applied to the side flaps 294 of the secondary package 250 to achieve an engagement of the engaging mechanism. In a preferred embodiment, the engagement mean is an adhesive patch, as disclosed earlier, the side flaps when pushed towards each other, folded down first on each other and thereafter, adhered under the impact of additional pushing sequence generated.

Accordingly, a top open package 250 is formed having counter-means 212 placed within the inner surface thereof. The method then proceeds to step 614 where the each of the picking means 246 picks one of the package 250 and conveys it towards the receiving conveyor 240 to deliver the supply of package 250, each having the predetermined desired shape. Further due to a difference in pitch of the overhead conveyor 210 and the slanted conveyor 245, each of the counter-means 212 is allowed to move out of the corresponding package 250 while being conveyed towards the receiving conveyor 240 at step 616.

In an embodiment, of the present invention, each of the step of the method 600 may be performed in varied order, sequentially and/or simultaneously.

INDUSTRIAL APPLICABILITY

The present invention relates to an shaping tool 200 for continuously at a constant and/or variable speed, and/or intermittently forming a plurality of packages 250 having a predetermined shape at the one or more contact portions thereof, for holding a plurality of objects or items, such as e.g. beverage containers generally containing liquids, such as beer, wine, cider, hard liquor (e.g., distilled beverage, spirit, liquor, hard alcohol, etc.), soft drinks (e.g., cola, soda, pop, tonic, seltzer), iced tea, soda water and other types of carbonated/non-carbonated beverages.

Particularly, the current disclosure is additional advantageous in maintaining the strength of the sidewall of the secondary package 250 due to the fact that, the counter-means 212, the clamping plates 222, and the shaping lugs 233, shaped in accordance with the predetermined shape to be achieved and therefore, a specific pushing sequence is employed at the specific contact portions 251, which are being supported specifically at the inner side thereof. Such an optimized and focused pushing sequence in addition to a complete control of the speed and direction of the movement of the shaping lugs 233, in turn the force of the pushing sequences by the control unit, allows the possibility of processing even the foldable blank 290 formed of very weak materials without damaging them. For example, in case of weak material, the movement is optimized such that while the tool 200 shapes the contact portions 251 of the secondary package 250, the impact is not too high that it damages the walls/contact portions 251 of the package 250 and also avoids/resist any movement or misalignment of the items, e.g. beverage containers, stored there within, with respect to the package 250.

Further, the shaping tool is adaptable to different dimensions of foldable blank and is therefore well suitable to process the packages of different sizes with ease and efficiently. Moreover, the predetermined shape may be changed by simply changing the lugs 233, and therefore not requiring changing the entire apparatus for different predetermined shapes.

Further, the present invention provides the possibility of manufacturing the conveyor system with integrally formed shaping tools. Such a conveyor system for shaping secondary package having predetermined shape, while being cost-efficient, is very quick and easy to use and offers comfortable handling of packages of any shape, size or any variety of configurations.

Additionally, since the shaping tool 200 of the current disclosure while being applicable onto the conveyor system, does not impact the rest of the conveying process. A single conveyor system may utilize as many as shaping tools within the same arrangement. Further, in case of one shaping tool is not working, rest can keep working and therefore, the fault tolerance of the plant can be increased.

It is contemplated for a person skilled in the art that the package 250 of the current disclosure may be implemented in various industries such as food industry, transport industry, house hold appliance industry in transportation of any kind of product or group of products, of any shape, size or any variety of configurations, without limiting it to the beverage industry.

Moreover, the package 250 formed of foldable blanks may be used to shape all currently known packages, known in the art including various packages formed from foldable blanks as well as packages constructed of materials such as thermoplastic, hybrid materials, woven metallic fabric that may include ferrous or nonferrous metals, etc., or any other suitable material.

The invention claimed is:

1. A shaping tool for shaping a package formed of a foldable blank, the tool comprising:

an overhead conveyor comprising a plurality of downwardly protruding spaced apart counter-means;

a first conveyor extending from a receiving end towards an output end, and adapted to receive foldable blanks from an incoming conveying line at the receiving end and to position the foldable blanks below one of the downwardly protruding counter-means;

a shaping station extending away from the receiving end, the shaping station comprising:

a pair of parallel shaping tracks, each positioned on one side of the first conveyor, the pair of parallel shaping tracks comprising a plurality of pairs of independently movable shaping lugs, each pair of shaping lugs having a predetermined shape and being adapted to receive one of the foldable blanks therebetween, the lugs of each pair being movable towards each other to form a package having a desired shape, wherein the shaping tool is configured to erect the foldable blank around the counter-means.

2. The shaping tool of claim 1 further comprising:

a receiving conveyor configured at a height lower than the first conveyor;

a slanted conveyor configured at a height above the first conveyor extending towards the receiving conveyor, and comprising a plurality of picking means for picking the formed package having the desired shape;

wherein the slanted conveyor is adapted to move at a pitch relative to the overhead conveyor such that the counter-means of the overhead conveyor is freed from the package while the package is received onto the receiving conveyor.

3. The shaping tool of claim 1, wherein the first conveyor comprises:

a plurality of clamping means, each configured to be positioned below one of the downwardly protruding counter-means, and adapted to clamp a bottom wall panel of one of the foldable blanks thereupon below the corresponding counter-means;

an erecting means for erecting first and second side panels of the foldable blanks.

4. The shaping tool of claim 3, wherein each clamping means comprises one or more clamping plates positioned on the first conveyor such that a bottom wall panel of an incoming foldable blank is received thereupon.

5. The shaping tool of claim 3, wherein the erecting means comprises one or more pairs of sloping rails, each sloping rail of each pair configured onto a different side of the first conveyor, such that each of the foldable blanks gets erected while moving on the first conveyor from the receiving end towards the output end.

6. The shaping tool of claim 1, wherein each of the shaping lugs comprises a shaping mover for enabling a longitudinal movement of the shaping lug on the corresponding shaping track.

7. The shaping tool of claim 1, wherein each pair of shaping lugs comprises a transversal movement mechanism for enabling a transversal movement of each lug of the pair of shaping lugs towards and away from the other lug of the pair of shaping lugs.

8. The shaping tool of claim 7, wherein the transversal movement mechanism comprises an extension means enabling a movement of each lug of the pair of shaping lugs in a direction towards and away from the other lug of the pair of shaping lugs.

9. The shaping tool of claim 8, wherein the extension means comprises an articulated extension assembly, the assembly comprising:

a pivotally movable mounting bracket having a first open end connected to a first articulated mover, a second open end connected to a second articulated mover and a pivotally movable central end connected to one of the shaping lugs of the pair of shaping lugs;

wherein a longitudinal movement of the first articulated mover and the second articulated mover towards away from each other transversally moves the one of the shaping lugs away from/towards the first and second articulated movers.

10. The shaping tool of claim 2, comprising a first powering means for enabling a movement of the incoming conveying line, the first conveyor, each of the parallel shaping tracks, the overhead conveyor and the slanted conveyor, wherein the first powering means is selected from one or more of a linear motor, servo motors, synchronic motor drives, or asynchronous motor drives.

11. The shaping tool of claim 1, comprises a plurality of movers for moving the counter-means, clamping means, the shaping lugs, or picking means, wherein the plurality of movers are powered by a powering means selected from one or more of a linear motor, servo motors, synchronic motor drives, or asynchronous motor drives.

12. The shaping tool of claim 1, wherein each foldable blank comprises one or more wall panels and one or more closing flaps configured with one or more closing mechanisms selected from one or more of a glue layer or locking cut-outs.

13. The shaping tool of claim 1, wherein the counter-means comprises one or more plunger means having a shape corresponding to the predetermined shape and adapted to support the package from inside at contact portions.

14. The shaping tool of claim 2 further comprising a control unit for individually optimizing a pitch of and controlling a synchronized movement of one or more of the overhead conveyor, the first conveyor, the parallel shaping tracks and the slanted conveyor such that a continuous shaping operation is achieved.

15. The shaping tool according to claim 2 wherein each of the incoming conveying line, the first conveyor, each of the parallel shaping tracks, the overhead conveyor and/or the slanted conveyor is horizontally and/or vertically position settable.

* * * * *